(12) United States Patent
Kitani et al.

(10) Patent No.: US 7,433,488 B2
(45) Date of Patent: Oct. 7, 2008

(54) INFORMATION RECORDING MEDIUM DRIVE DEVICE, INFORMATION PROCESSING APPARATUS, DATA REPLAY CONTROL SYSTEM, DATA REPLAY CONTROL METHOD, AND COMPUTER PROGRAM

(75) Inventors: Satoshi Kitani, Tokyo (JP); Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 768 days.

(21) Appl. No.: 10/875,357

(22) Filed: Jun. 24, 2004

(65) Prior Publication Data
US 2004/0268128 A1 Dec. 30, 2004

(30) Foreign Application Priority Data
Jun. 24, 2003 (JP) ............................ 2003-179706

(51) Int. Cl.
*G06K 9/00* (2006.01)
(52) U.S. Cl. ...................... 382/100; 713/176; 348/460
(58) Field of Classification Search ................ 382/100, 382/232; 380/210, 252, 287, 54; 713/176; 704/200.1, 273; 381/73.1; 348/460, 463
See application file for complete search history.

(56) References Cited

U.S. PATENT DOCUMENTS

| | | | | |
|---|---|---|---|---|
| 6,310,956 B1 * | 10/2001 | Morito et al. | ............... | 380/201 |
| 6,314,518 B1 * | 11/2001 | Linnartz | ..................... | 713/176 |
| 6,456,724 B1 * | 9/2002 | Watanabe | ................... | 382/100 |
| 6,456,725 B1 * | 9/2002 | Cox et al. | ................... | 382/100 |
| 6,523,113 B1 * | 2/2003 | Wehrenberg | ................ | 713/176 |
| 7,111,169 B2 * | 9/2006 | Ripley et al. | ................ | 713/176 |
| 7,280,661 B2 * | 10/2007 | Sako et al. | ................... | 380/201 |
| 2003/0126445 A1 * | 7/2003 | Wehrenberg | ................ | 713/176 |

* cited by examiner

*Primary Examiner*—Anand Bhatnagar
(74) *Attorney, Agent, or Firm*—Wolf, Greenfield & P.C.

(57) ABSTRACT

A content, restored in an information processing apparatus, for replaying a content, such as a personal computer, is fed back to a drive device. The drive device detects an electronic watermark from the transferred restored content, and controls content outputting from the drive device. In this arrangement, an electronic watermark is reliably detected and content replay control is performed based on the detected electronic watermark in any type of coding including MPEG 2, MPEG-1, MPEG-4 regardless of type of coding or even if the content is encrypted.

18 Claims, 18 Drawing Sheets

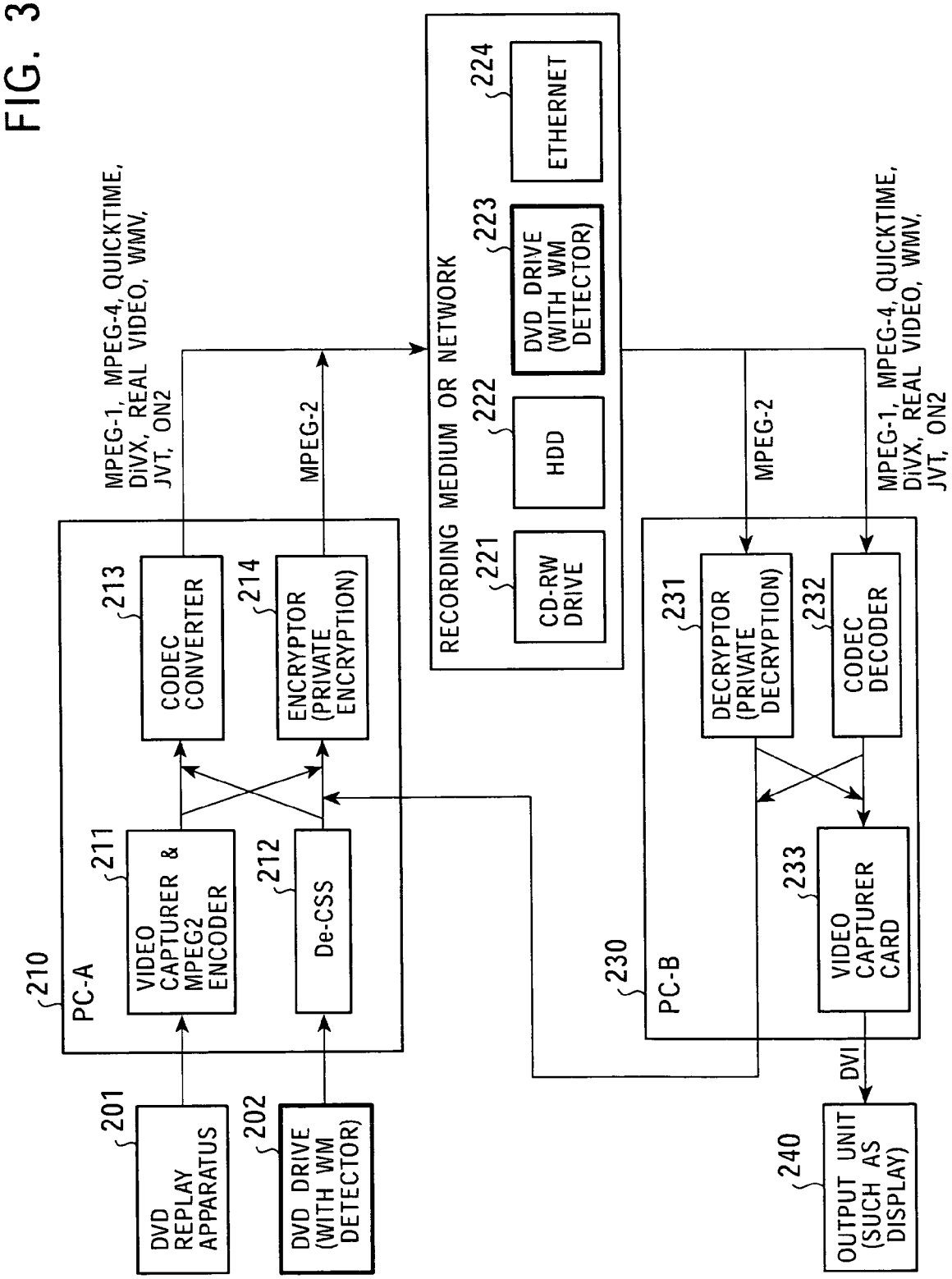

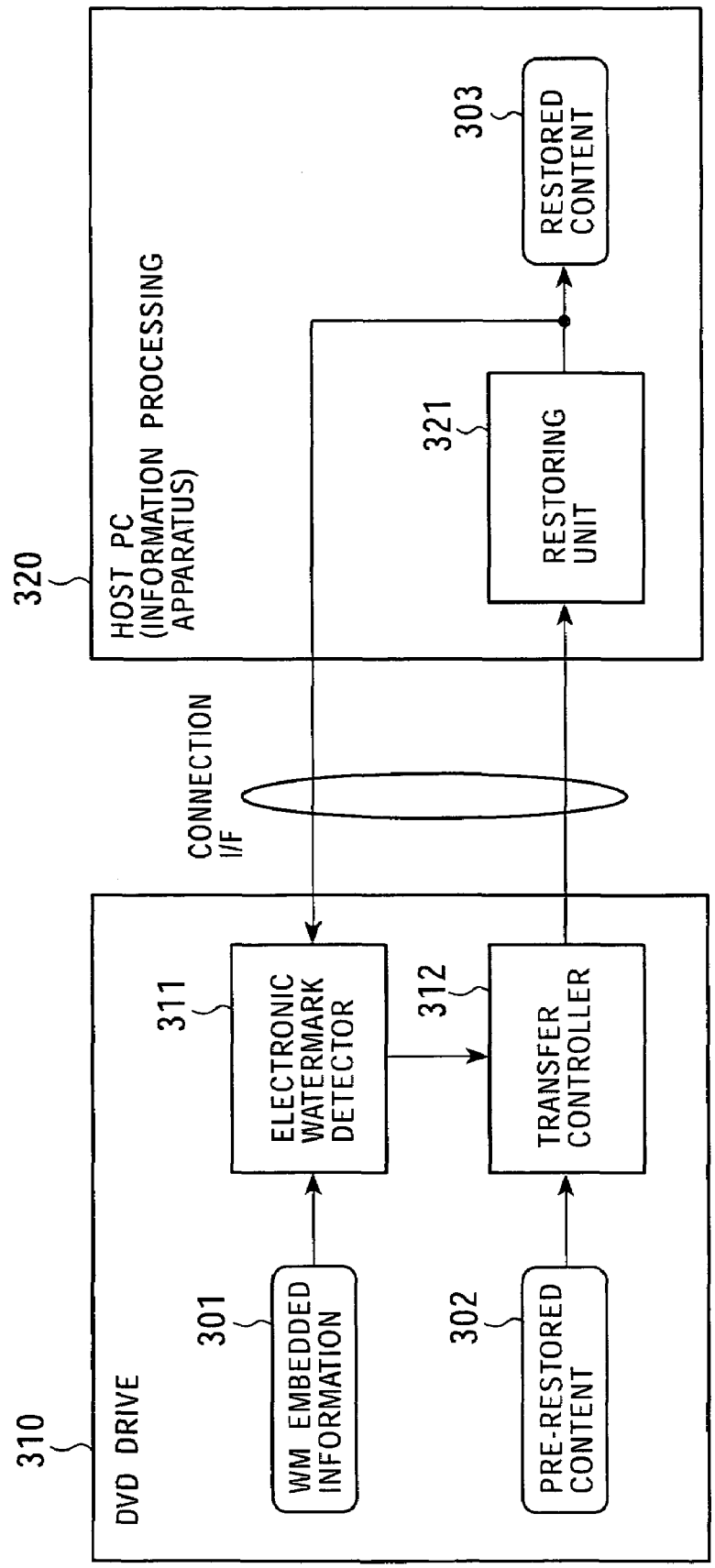

FIG. 9A

SENDING NODE KEY OF VERSION:
t TO DEVICES 0, 1, AND 2

| VERSION: t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 9B

SENDING NODE KEY OF VERSION:
t TO DEVICES 0, 1, AND 2

| VERSION: t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

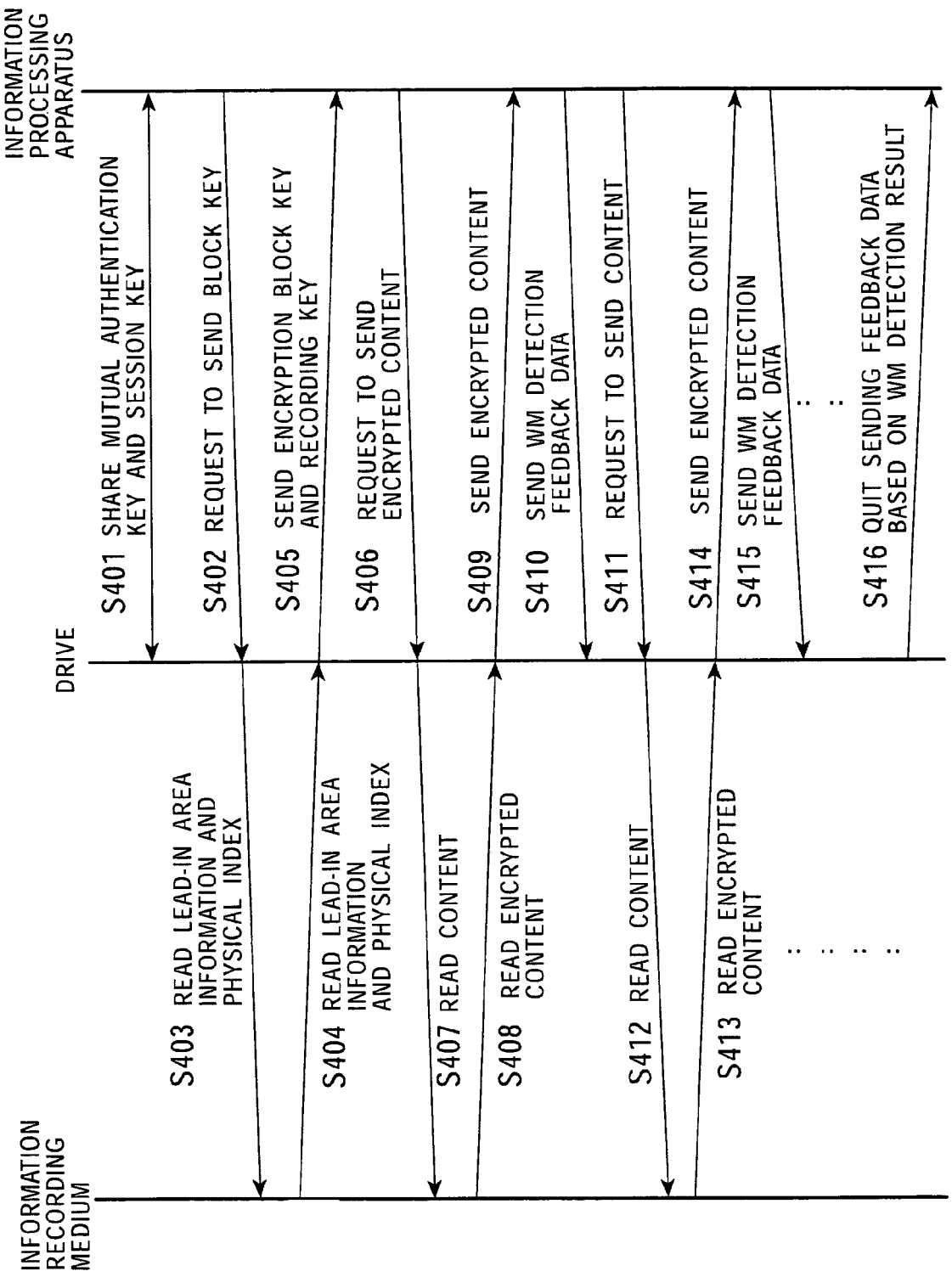

INFORMATION RECORDING MEDIUM DRIVE DEVICE, INFORMATION PROCESSING APPARATUS, DATA REPLAY CONTROL SYSTEM, DATA REPLAY CONTROL METHOD, AND COMPUTER PROGRAM

BACKGROUND OF THE INVENTION

1. Field of the Invention

The present invention relates to an information recording medium drive device, an information processing apparatus, a data replay control system, a data replay control method, and a computer program. In particular, the present invention relates to an information recording medium drive device, an information processing apparatus, a data replay control system, a data replay control method, and a computer program for preventing an unauthorized use of a content by effectively detecting an electronic watermark regardless of the type of data format.

2. Description of the Related Art

Currently, a variety of contents is available via networks such as the Internet, or in recording media such as compact disks (CDs), digital versatile disks (DVDs), mini disks (MDs). The contents may include audio data such as music, video data such as movies, game programs, and various application programs. The available contents may be replayed on personal computers (PC), or replay devices such as CD players, DVD players, MD players or game playing machines.

The distributorship of the majority of contents of the music data and the image data is typically held by a producer or a seller of the contents. A certain limitation is imposed on the distribution of the contents, in other words, an authorized user only has the right to use the corresponding content, and unauthorized copying of a content is typically inhibited.

Digital recording apparatuses and recording media are currently in widespread use. Such a digital recording apparatus and a digital recording medium allow a movie or audio to be repeatedly recorded or replayed without any quality drop involved. Use of an unauthorized copied contents becomes a concern.

Recently developed recording media, such as a DVD, can digitally record a large amount of data as large as a single movie in one piece of media. To protect copyright of a content from unauthorized copying becomes more and more important considering that video information is easily recorded as digital information.

Unauthorized copying of movie contents actually happen. High-definition digital video cameras and high-definition digital video recorders are expected to be commercialized for consumer market. If the problem of copyright protection is left unresolved, the benefits of copyright holders will be seriously damaged.

The content scramble system (CSS) is used as a copyright protection technique in the DVD disk storing video contents. The use of the CSS is permitted on the DVD-ROM media only. The CSS contract prohibits the use of the CSS on recording type DVDs such as DVD-R, DVD-RW, DVD+R, and DVD+RW. The CSS contract does not permit a bit-by-bit copying from a DVD video disk to a recording type DVD disk.

Even deCSS software programs for decrypting the CSS encryption are distributed over the Internet. One can get easily such a deCSS software program, decrypt the code of a DVD and write the DVD content onto a recording type DVD in a plain text.

Available as a means for preventing unauthorized copying is an electronic watermark (WM). Copyright information such as copy protection information is embedded as an electronic watermark in a content such as video or audio. An apparatus that replays or records a content detects the electronic watermark from the content, and performs control based on electronic watermark information, thereby preventing unauthorized copying.

Referring to FIGS. 1A and 1B, a content replay control process using the electronic watermark is now discussed. FIG. 1A illustrates an arrangement for detecting the electronic watermark in a MPEG bit stream, and FIG. 1B illustrates an arrangement for detecting the electronic watermark from a baseband signal subsequent to MPEG decoding.

As shown in FIG. 1A, a DVD decoder 112 performs a decryption process (ECMA-267, for example) on a DVD-ROM video disk 111 storing a video content in a DVD format, and a decryptor 114 decrypts the video content using a key detected by a key detector 113.

The decryption process performed by the decryptor 114 includes a descrambling process for CSS scrambling. The key detector 113 acquires the key for descrambling from the DVD-ROM video disk 111. The content stored in the DVD-ROM video disk 111 is not limited to the one encrypted with not only CSS but also other encryption method. The key detector 113 acquires a key applicable to the decryption of the encrypted content stored in the DVD-ROM video disk 111. Using the acquired key, the decryptor 114 decrypts the content, and outputs an MPEG-2 bit stream.

The MPEG-2 bit stream acquired by the decryptor 114 is subjected to an MPEG-2 decode process (such as ISO-13818) in an MPEG-2 decoder 115, while also being subjected to an electronic watermark detection process in the electronic watermark detector 116.

The electronic watermark detected by the electronic watermark detector 116 includes copyright information such as copy protection information, copy permission information, and replay permission information. The copyright information is embedded as bit data in the MPEG-2 bit stream. The electronic watermark detector 116 detects copyright management information as the electronic watermark information embedded, thereby outputting the copyright management information to a replay controller 117.

In accordance with the copyright management information input from the electronic watermark detector 116, the replay controller 117 performs a replay control of the decoded content input from the MPEG-2 decoder 115.

FIG. 1B illustrates the arrangement for detecting the electronic watermark from the baseband signal subsequent to the MPEG decoding. The difference between the arrangement shown in FIG. 1B and the arrangement shown in FIG. 1A is that the electronic watermark detector 116 detects the electronic watermark from the baseband signal subsequent to the decoding process of the MPEG-2 decoder 115 in the arrangement shown in FIG. 1B.

In the arrangement shown in FIG. 1B, the electronic watermark detector 116 detects the electronic watermark from the baseband signal. Like in the arrangement shown in FIG. 1A, the electronic watermark information detected includes copyright management information such as copy protection information, copy permission information, and replay permission information. The copyright information is embedded as bit data in the baseband signal. The electronic watermark detector 116 detects copyright information as the electronic watermark information embedded, and outputs the copyright management information to a replay controller 117.

The replay controller 117 performs replay control on the decoded content input from the MPEG-2 decoder 115 based on the copyright information input from the electronic watermark detector 116.

The appearance of the deCSS software programs is based on the fact that the key used by the decryptor 114 of FIG. 1 was broken. More specifically, key data was deciphered by reverse engineering a DVD player software program, and the entire CSS algorithm was finally deciphered after successive deciphering steps based on the broken key.

When the copyright protection technique such as the CSS is applied to an application program on a PC, tamper resistance is also typically included to shield the copyright protection technique from analysis. There is no measure indicating the strength of the tamper resistance. At what level the tamper resistance against reverse engineering is implemented is left to each implementer's own experience and performance. Finally, the CSS was deciphered.

Since people are concerned with security problem on the PCs, the effectiveness of the electronic watermark detection on the PC is also in question. The problem is the ease of reverse engineering of any program running on the PC, which is an open architecture.

In one of the proposed techniques, electronic watermark information is detected in a drive, which is easier to configure in black box than the PC.

Referring to FIGS. 2A and 2B, arrangements of detecting the electronic watermark information in a drive are discussed. FIG. 2A illustrates a storage process of an content and an electronic watermark onto a DVD-ROM, and a replay process of the DVD-ROM. FIG. 2B illustrates a control mechanism in which a content is copied to a DVD-R from a DVD-ROM, and the copied content is then replayed.

As shown in FIG. 2A, an watermark embedder 133 embeds watermark (WM) information 132 containing copy never information, for example, into a content 131 such as a movie, and a CSS scrambler 135 scrambles the content using a predetermined CSS key 134. A content stored DVD-ROM 136 thus results. An MPEG-2 encoding process (not shown) is performed as a pre-phase prior to the content scrambling process. Subsequent to the scrambling process, an encoding process for a DVD format is performed before being recorded onto the DVD-ROM 136. These processes are typically performed in each of standard disk manufacturers.

A user may replay the content stored DVD-ROM 136 on a host apparatus such as a PC. The DVD-ROM 136 is loaded on a DVD drive 140 connected to the host 150. For example, the content is transferred from the DVD drive 140 to the host 150 through an AT Attachment with Packet Interface (ATAPI) for replay.

The ATAPI is used to connect a peripheral device such as a CD-ROM drive, other than hard disks, to an integrated drive electronics (IDE) interface or AT attachment (ATA) interface. The peripheral device is controlled by packetizing a command from SCSI and handing the packetized command over to the IDE interface.

The DVD drive 140 includes an electronic watermark detector 141 and a CSS authenticator 142. The electronic watermark detector 141 detects an electronic watermark from the DVD-ROM 136 if a CSS key applied to descrambling of the CSS scramble is detected from the content stored DVD-ROM 136. Based on the electronic watermark detection, the electronic watermark detector 141 outputs the content to the host 150 through the ATAPI. Before the transfer of the content, an authentication process is performed between the CSS authenticator 142 in the DVD drive 140 and a CSS authenticator 151 in the host 150 in accordance with a predetermined authentication sequence. The authentication is established on condition that the CSS authenticator 142 in the DVD drive 140 sends the CSS key to the CSS authenticator 151 in the host 150, and then the content is output.

A CSS descrambler 152 in the host 150 descrambles (decrypts) the content input from the DVD drive 140 using the CSS key input from the CSS authenticator 151. The MPEG2 decoder 153 performs an MPEG2 decode process on the content. The content is thus replayed.

FIG. 2B illustrates a control process in which the content is copied from the DVD-ROM to the DVD-R and the copied content is replayed.

A deCSS 162 is applied to a content from a DVD-ROM 161 to remove a CSS key 163. A copy content is thus descrambled into a plain text, which is stored onto the DVD-R 165. An electronic watermark 164 cannot be removed. The DVD-R 165 having this content stored still contains the electronic watermark 164 (containing copy never information).

The electronic watermark detector 141 in the DVD drive 140 detects the electronic watermark, conditioned on the acquisition of the CSS key, and outputs the content to the host 150, conditioned on the detection of the electronic watermark. The CSS key cannot be found from the DVD-R 165 from which the CSS key has already been removed. The electronic watermark detection process is not performed, and the content output process is not performed. The host 150 is prevented from replaying the content.

However, a variety of problems is pointed out in the incorporation of the electronic watermark detector in the drive. Radon access is possible on a unit smaller than a unit of video information or audio information. Write data and read data flows through a single ATAPI channel. The scale of a circuit for the detection of the electronic watermark is large and thus costly. Process time for detecting the electronic watermark presents difficulty in an attempt to reduce write time and read time of the drive.

Subsequent to a ripping operation such as the deSCC operation, a content may be subjected to a codec process such as MPEG-1 or QuickTime, different from MPEG-2, or may be subjected to an encryption process. In this way, the process of the electronic watermark detector in the drive for executing the electronic watermark detection process on the MPEG-2 bit stream is deactivated. It is also pointed out that an electronic watermark method particularly designed for a certain codec is also deactivated by modifying syntax of the codec.

The aforementioned drawback is discussed with reference to FIG. 3. A content, replayed (read) in an authorized fashion from a DVD replay apparatus 201 or a DVD drive 202, is input to a PC-A 210. The output of the DVD replay apparatus, which is analog data, is converted in digital data, and MPEG2 processed by video capturer and MPEG2 encoder 211 in the PC-A 210. The content input from the DVD drive 202 is a scrambled MPEG-2 bit stream. A DeCSS 212 in the DVD replay apparatus descrambles the content.

The output of the video capturer and MPEG2 encoder 211 and the output of the DeCSS 212 respectively become contents in MPEG-2 bit stream.

These MPEG-2 bit stream data are input to a CODEC converter 213 for conversion into encoded data different from the MPEG2. Alternatively, the MPEG-2 bit stream data may be input to an encryptor 214 for a private encryption process such as an encryption process that employs a general-purpose encryption process algorithm such as DES. The resulting data is then stored in a recording medium or transferred to another PC-B 230 via a network.

The CODEC converter 213 converts the bit stream data into encoded data such as of MPEG-1, MPEG-4, QuickTime, DiVX, RealVideo, Windows Media Video, JVT, ON2, etc. In many cases, an electronic watermark detector installed in a PC or a drive typically performs an electronic watermark detection process that is input data format dependent. The majority of currently available electronic watermark detectors detects an electronic watermark that is effective only if the input data complies with the MPEG2 format. The electronic watermark detection process cannot effectively function in data in formats other than the MPEG2 format.

The coded data other than the MPEG2 or encrypted data is stored in a recording medium such as a CD-R, a hard disk, or a DVD. A CD-RW drive, a HDD 222, and a DVD drive 223 are respectively connected to the PC-B 230 to read data therefrom. Alternatively, these drives may be connected to the PC-B 230 via a network such as Ethernet® 224.

These pieces of data are input to the PC-B 230 without any problem. An electronic watermark detector in the CD-RW drive 221 is unable to effectively function if data is not in the MPEG2 format. The DVD drive 223 determines that the data is the one not to be processed in the electronic watermark detection process, and outputs the data to the PC-B 230. The other drives, namely, CD-RW drive 221 and HDD 222 output data to the PC-B 230 as in standard data read operation. The data transfer using the network such as Ethernet 224 is also performed without any problem.

If the data input to the PC-B 230 is encrypted MPEG2 data, a decryptor 231 performs a decryption process corresponding to the encryption process performed by the encryptor 214 in the PC-A 210, and further performs an MPEG2 decoding process. If the input data is data such as of MPEG-1, MPEG-4, QuickTime, DiVX, RealVideo, Windows Media Video, JVT, ON2 or the like other than MPEG2, a CODEC decoder 232 decodes the encoded data.

A video capturer card 233 digital-to-analog converts the decoded data to be output to an output unit 240 such as a display, a loudspeaker, and the like.

A content, which must be replay controlled based on the copyright information such as copy control information embedded in the content as an electronic watermark, is converted into encoded data other than MPEG2. The MPEG2 data is stored in or transferred to a recording medium. In this way, the content is freely replayed without being subject to the replay control in accordance with the electronic watermark information.

Japanese Unexamined Patent Application Publication No. 2000-115727 discloses a copyright protection technique incorporating an electronic watermark in which a DVD drive correctly detects electronic watermark information embedded beforehand in video or audio information. According to the disclosure, an error status (not permitting reading and writing) is returned to a PC if unauthorized copying is detected based on the electronic watermark information from successively read contents. If the content is converted to data other than of MPEG2, or if MPEG2 data is stored in or transferred to a recording medium as encrypted data, the content is freely replayed without being subject to the replay control in accordance with the electronic watermark information.

Japanese Unexamined Patent Application Publication No. 2001-210013 discloses a method of detecting electronic watermark information in a DVD drive at low cost. According to the disclosure, the output of video and audio signal is stopped if unauthorized copying is detected. If the content is converted to data other than of MPEG2, or if MPEG2 data is stored in or transferred to a recording medium as encrypted data, the content is freely replayed without being subject to the replay control in accordance with the electronic watermark information.

Japanese Unexamined Patent Application Publication No. 11-176087 discloses a control structure of a drive and a decoder separate from the drive for decoding data input from the drive. The decoder detects an electronic watermark from the decoded data, and determines, based on the detection result, whether or not the data is an unauthorized copied content. The control structure is arranged on a PC side, and related process is dependent on the PC. It should be noted that the relatively low security level of the PC invites the appearance of the deCSS software program. An attempt to control the unauthorized copying with the electronic watermark can be outwitted.

SUMMARY OF THE INVENTION

Accordingly, it is an object of the present invention to provide an information recording medium drive device, an information processing apparatus, a data replay control system, a data replay control method, and a computer program for causing a replay control process to function properly with the detection of an electronic watermark even when data conversion is performed, for example, codec data like MPEG2 data is converted in format or an encryption process is performed.

The present invention in a first aspect relates to an information recording medium drive device for reading data from an information recording medium and outputting the read data to an information processing apparatus, and includes a replay unit for replaying the data from the information recording medium, a data input and output unit that outputs the replayed data to the information processing apparatus while receiving data that has been processed in a predetermined process in the information processing apparatus, an electronic watermark detector for performing an electronic watermark detection process, and a controller that controls data outputting to the information processing apparatus based on the result of electronic watermark detection process of the electronic watermark detector, wherein the electronic watermark detector performs the electronic watermark detection process on the processed data that is supplied from the information processing apparatus through the data input and output unit, and wherein the controller continues or quits the data outputting to the information processing apparatus based on the result of the electronic watermark detection process of the processed data of the electronic watermark detector.

In a preferred embodiment, the information recording medium stores data that is encrypted and/or encoded, and the electronic watermark detector performs the electronic watermark detection process on the processed data that is generated based on a baseband signal that is input to the information processing apparatus from the information recording medium drive device and is then decrypted and/or decompressed by the information processing apparatus.

Preferably, the data outputting to the information processing apparatus and inputting of the processed data are performed using a common signal path.

In a preferred embodiment, the electronic watermark detector detects an identification embedded as an electronic watermark in the data stored in the information recording medium, and the controller continues or quits data outputting to the information processing apparatus depending on the result of the detection of the identification.

In a preferred embodiment, the electronic watermark detector detects copy control information embedded as an electronic watermark in the data stored in the information recording medium, and the controller continues or quits the data outputting to the information processing apparatus based on the result of the detection of the copy control information.

The information recording medium drive device may further include a recording medium type determination unit that determines whether or not the information recording medium is a read-only memory type permitting no data writing, wherein the controller continues or quits data outputting to the information processing apparatus based on the result of the detection of an electronic watermark provided by the electronic watermark detector and the result of the determination of the recording medium type provided by the recording medium type determination unit.

The information recording medium drive device may include an authenticator for performing an authentication process with the information processing apparatus, wherein authentication is established on condition that the data stored in the information recording medium is output to the information processing apparatus.

A data decryption key may be encrypted based on a session key produced in the authentication process and the encrypted data decryption key is output to the information processing apparatus.

The present invention in a second aspect relates to an information processing apparatus for performing a replay process on data stored in an information recording medium and input from an information recording medium drive device, and includes a data decryptor for performing a decryption process on the data stored in the information recording medium input from the information recording medium drive device, and a communication unit for outputting, to the information recording medium drive device, electronic watermark detection process data produced based on a baseband signal that is obtained as a result of data decryption of the data decryptor.

The information processing apparatus may further include an authenticator for performing an authentication process with the information recording medium drive device, wherein the electronic watermark detection process data is encrypted based on a session key produced in the authentication process by the authenticator and the encrypted data is output to the information recording medium drive device.

The present invention relates in a third aspect relates to a data replay control system including a drive device for reading data from an information recording medium and for outputting the read data to the outside, and an information processing apparatus for receiving the output data of the drive device and performing a replay process on the input data. The information processing apparatus includes a data decryptor for performing a decryption process on the data stored in the information recording medium and input from the drive device, and a data communication unit for outputting, to the drive device, processed data produced based on the decryption process of the data decryptor. The drive device includes a replay unit for replaying the data from the information recording medium, a data input and output unit that outputs the replayed data to the information processing apparatus while receiving data that has been processed in a predetermined process in the information processing apparatus, an electronic watermark detector for performing an electronic watermark detection process on the processed data input from the information processing apparatus, and a controller that controls data outputting to the information processing apparatus based on the result of electronic watermark detection process of the electronic watermark detector.

Preferably, each of the drive device and the information processing apparatus includes an authenticator for performing an authentication process, and authentication is established on condition that the drive device outputs the data stored in the information recording medium to the information processing apparatus.

The data outputting to the information processing apparatus from the drive device and inputting of the processed data from the information processing apparatus to the drive device may be performed using a common signal path.

In a preferred embodiment, the drive device includes a recording medium type determination unit that determines whether or not the information recording medium is a read-only memory type permitting no data writing, and the controller continues or quits data outputting to the information processing apparatus based on the result of the detection of the electronic watermark provided by the electronic watermark detector and the result of the determination of the recording medium type provided by the recording medium type determination unit.

The present invention in a fourth aspect relates to a data replay control method for an information recording medium drive device for reading data from an information recording medium and outputting the read data to an information processing apparatus, and includes a replay step for replaying the data from the information recording medium, a data input and output step for outputting the replayed data to the information processing apparatus while inputting data that has been processed in a predetermined process in the information processing apparatus, an electronic watermark detecting step for performing an electronic watermark detection process on the processed data, and a controlling step for continuing or quitting the data outputting to the information processing apparatus based on the result of the electronic watermark detection process in the electronic watermark detecting step.

Preferably, the information recording medium stores data that is encrypted and/or encoded, and the electronic watermark detecting step includes performing the electronic watermark detection process on the processed data that is generated based on a baseband signal that is input to the information processing apparatus from the information recording medium drive device and is then decrypted and/or decompressed by the information processing apparatus.

Preferably, the electronic watermark detecting step includes detecting an identification embedded as an electronic watermark in the data stored in the information recording medium, and the controlling step includes continuing or quitting the data outputting to the information processing apparatus depending on the result of the detection of the identification.

Preferably, the electronic watermark detecting step includes detecting copy control information embedded as an electronic watermark in the data stored in the information recording medium, and the controlling step includes continuing or quitting the data outputting to the information processing apparatus based on the result of the detection of the copy control information.

The data replay control method may further include a recording medium type determining step for determining whether or not the information recording medium is a read-only memory type permitting no data writing, wherein the controlling step includes continuing or quitting the data outputting to the information processing apparatus based on the result of the detection of an electronic watermark provided in the electronic watermark detecting step and the result of the determination of the recording medium type provided in the recording medium type determining step.

The data replay control method may further include an authenticating step for performing an authentication process with the information processing apparatus, wherein authentication is established in the authenticating step on condition that the data stored in the information recording medium is output to the information processing apparatus.

The data replay control method may further include outputting, to the information processing apparatus, a data decryption key that is encrypted based on a session key produced in the authenticating step.

The present invention in a fifth aspect relates to a data processing method for an information processing apparatus that performs a replay process on data stored in an information recording medium and input from an information recording medium drive device, and includes a data decrypting step for performing a decryption process on the data stored in the information recording medium and input from the information recording medium drive device, and a data outputting step for outputting, to the information recording medium drive device, electronic watermark detection process data produced based on a baseband signal that is obtained as a result of the data decrypting step.

The data processing method may further include an authenticating step for performing an authentication process with the information recording medium drive device, wherein the data outputting step includes outputting, to the information recording medium drive device, the electronic watermark detection process data that is encrypted based on a session key produced in the authenticating step.

The present invention in a sixth aspect relates to a computer program for performing a data replay control method for an information recording medium drive device for reading data from an information recording medium and outputting the read data to an information processing apparatus, and includes a replay step for replaying the data from the information recording medium, a data input and output step for outputting the replayed data to the information processing apparatus while inputting data that has been processed in a predetermined process in the information processing apparatus, an electronic watermark detecting step for performing an electronic watermark detection process on the processed data, and a controlling step for continuing or quitting data outputting to the information processing apparatus based on the result of the electronic watermark detection process of the electronic watermark detecting step.

In accordance with the present invention, a content restored in an apparatus replaying a content, such as information processing apparatus like a PC, is fed back to a drive device, and the drive device detects an electronic watermark from the restored content. The drive device controls content outputting therefrom in accordance with the detected electronic watermark. Even if the data prior to restoration is in any format such as MPEG2, MPEG-1, MPEG-4, QuickTime, DiVX, RealVideo, Windows Media Video, JVT, ON2 or the like, or any encrypted data, the arrangement of the present invention enables a control process using the electronic watermark detected from the restored content that is obtained as a result of a decryption process of encrypted data. Content replay control is thus performed regardless of the format of the content stored in the recording medium.

In accordance with the present invention, the data outputting from the drive device to the information processing apparatus as a host that executes a replay process and the feedback of electronic watermark detection data from the information processing apparatus to the drive device are performed through a common interface (ATAPI). By disconnecting a path that returns data to drive device, a data reading path is also disconnected. An unauthorized replay by forging feedback data is thus prevented.

The computer program of the present invention is supplied to a general-purpose computer, which executes various program codes, in computer readable recording media or through communication media. The recording media include storage media such as CD, DVD, and MO, and the communication media include a network. By supplying the computer program to a computer system in a computer readable form, the computer system performs a process responsive to the computer program.

These and other objects, features and advantages will be more fully understood from the following description of the embodiments of the invention, and the accompanying drawings. In this specification, the word system refers to a logical set of a plurality of apparatuses, and each of the apparatuses is not necessarily stored in the same casing.

BRIEF DESCRIPTION OF THE DRAWINGS

FIG. 3 illustrates a problem relating to the replay control process based on the electronic watermark detection process;

FIG. 4 summarizes the replay control process based on the electronic watermark detection process in accordance with the present invention;

FIGS. 9A and 9B illustrate an enabling key block (EKB) for use in the distribution of various keys and data;

FIG. 18 illustrates a data input and output sequence in communication among the information recording medium, the drive device, and the information processing apparatus during the content replay period.

DESCRIPTION OF THE PREFERRED EMBODIMENTS

Figure 1A:
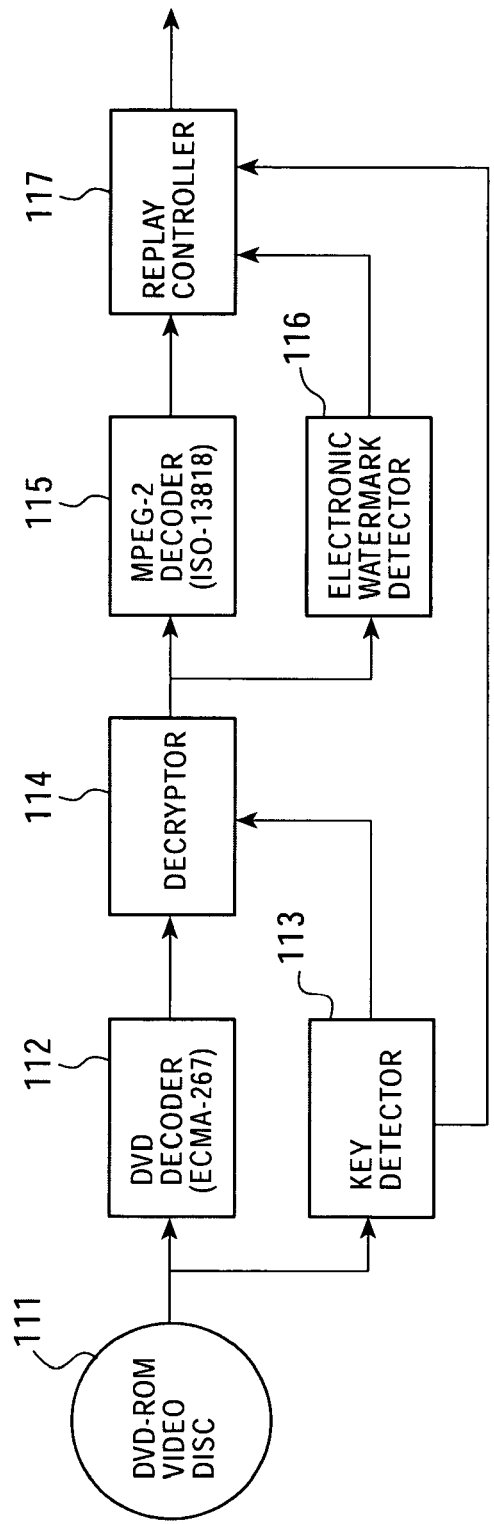
FIGS. 1A and 1B illustrate an electronic watermark detection process.
Figure 1B:
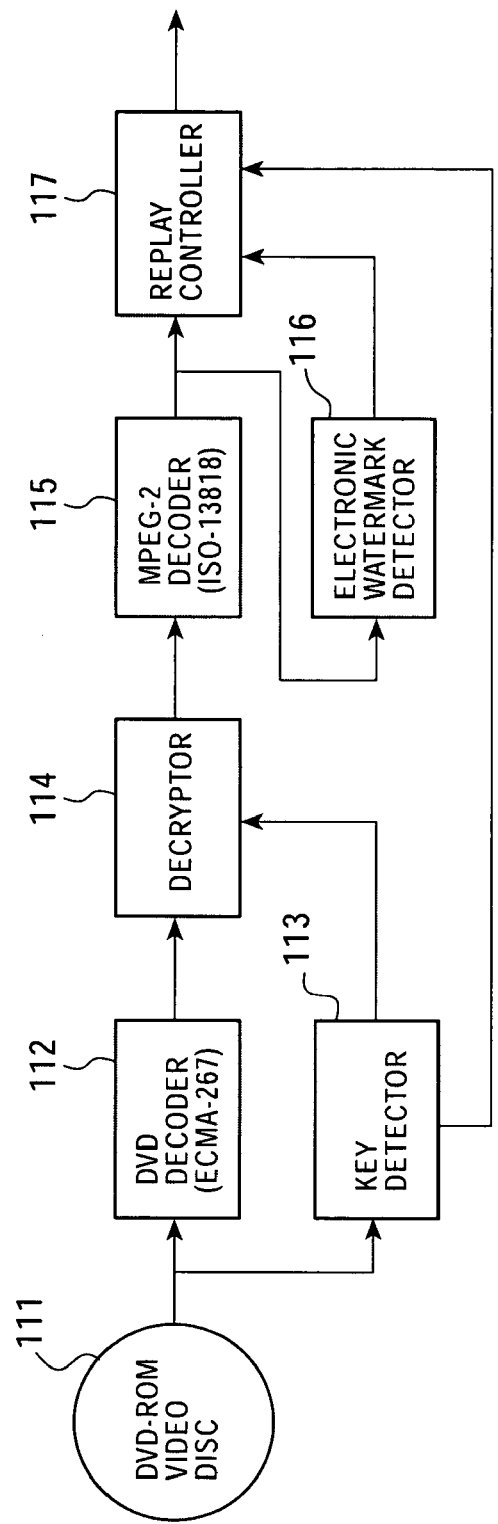
Figure 2A:
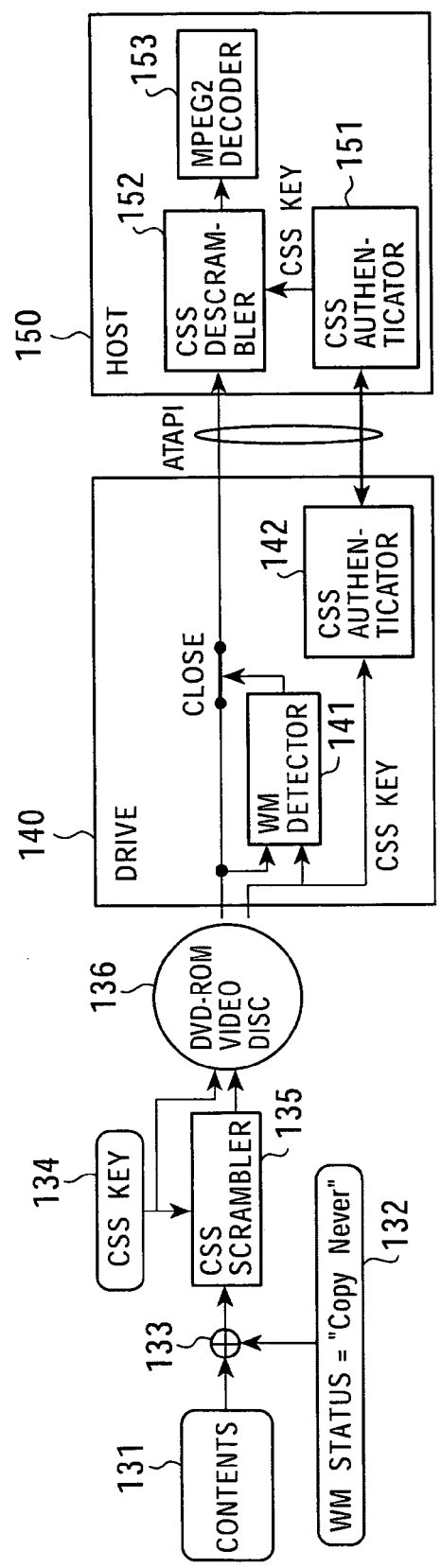
FIGS. 2A and 2B illustrate a replay control process based on the electronic watermark detection process.
Figure 2B:
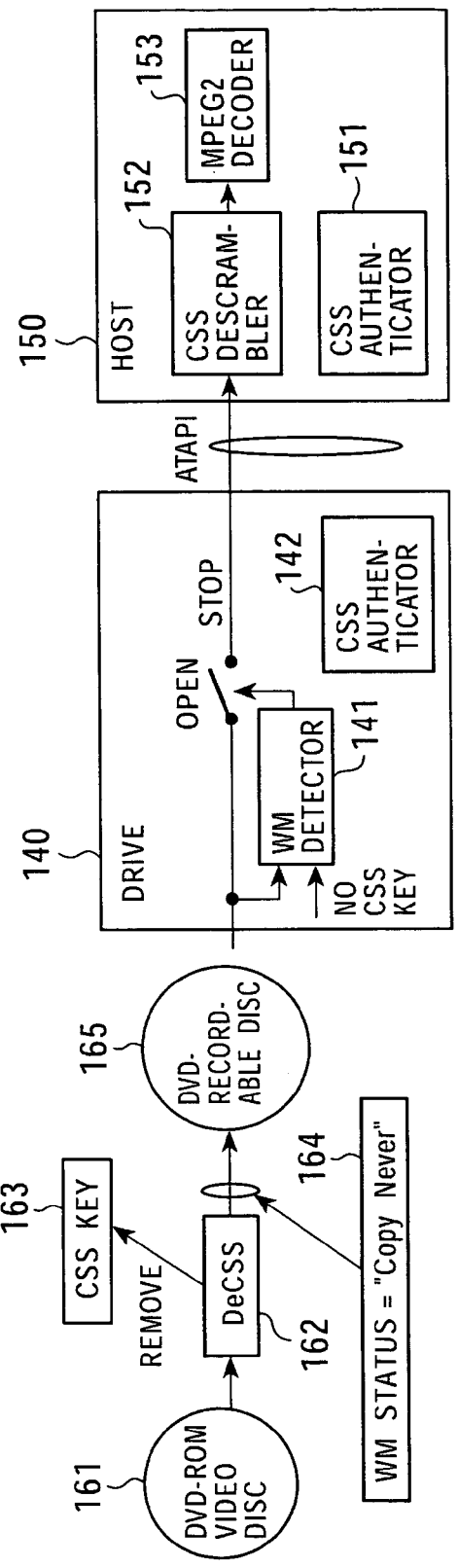

An information recording medium drive device, an information processing apparatus, a data replay control system, a data replay control method, and a computer program of the present invention are discussed in detail.

Referring to FIG. 4, processes performed by the information recording medium drive device and the information processing apparatus in accordance with the present invention are now discussed.

A recording medium, such as a DVD, having a content with copyright information such as copy inhibit information embedded as an electronic watermark therewithin is loaded in a drive device 310, such as a DVD drive device. The drive device 310 reads data from the recording medium, and outputs the read data to an information processing apparatus 320 as a replay apparatus for replaying the content through a connection interface. The information processing apparatus 320, such as a PC, receives, from the drive device 310, the data read from the recording medium. The information processing apparatus 320 performs a data restoration process including a decryption process on the encrypted data, and a data decompression process on coded data, and then outputs the restored data as a content to a display, a loudspeaker, etc.

The drive device 310 transfers the pre-restored content 302, MPEG2 encoded or encrypted in data processing, to the information processing apparatus 320 functioning as a host under process control of the electronic watermark detector 311.

The information processing apparatus 320, such as a PC, restores the data input from the drive device 310 using a restoring unit 321, and outputs the restored content to a display, a loudspeaker, etc. The restored content is fed back to the drive device 310 through the connection interface.

The electronic watermark detector 311 in the drive device 310 performs the electronic watermark detection process on the restored data fed back from the information processing apparatus 320, thereby detecting electronic watermark embedded information 301. The electronic watermark information is then supplied to the transfer controller 312.

The transfer controller 312 receives the electronic watermark information the electronic watermark detector 311 detects from the restored content, and controls the transfer of the pre-restored content as to whether to continue or quit the transfer of the pre-restored content. If an unauthorized replay process is detected based on the detected electronic watermark information, the transfer controller 312 quits the transfer of the content.

In accordance with the present invention, the data restored in the information processing apparatus, such as a PC, for replaying the content is fed back to the drive device. The drive device detects the electronic watermark from the restored content fed back from the information processing apparatus. The drive devices controls the outputting of the content therefrom based on the detected electronic watermark.

Even if the data prior to restoration is in any format such as MPEG2, MPEG-1, MPEG-4, QuickTime, DiVX, RealVideo, Windows Media Video, JVT, ON2 or the like, or any encrypted data, the arrangement of the present invention enables a control process using the electronic watermark detected from the restored content that is obtained as a result of a decryption process of encrypted data or a decoding process of encoded data. Content replay control is thus performed regardless of the format of the content stored in the recording medium.

Figure 5:
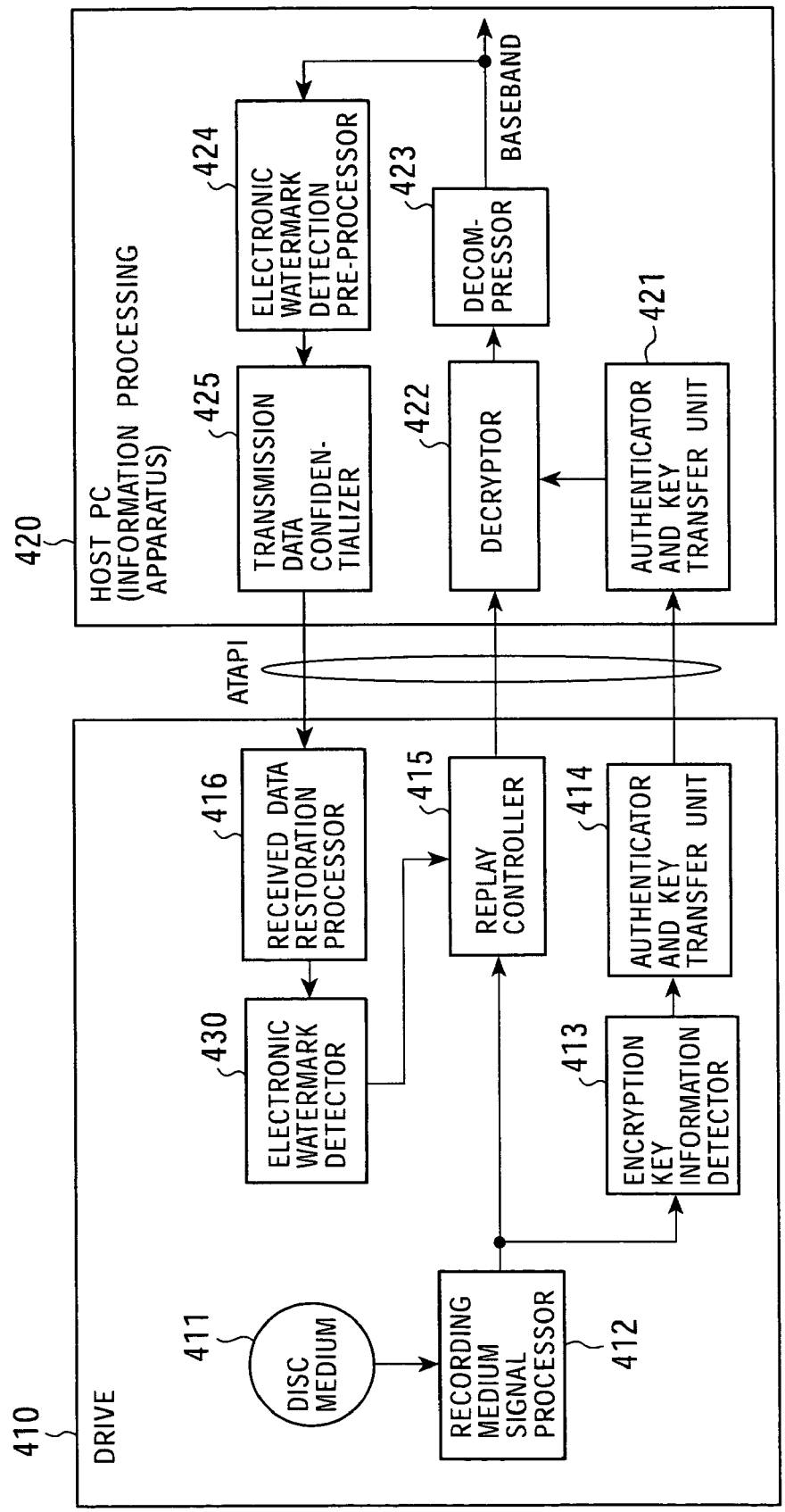
FIG. 5 illustrates the operation of a drive device and an information processing apparatus functioning as a host in the replay control process based on the electronic watermark detection process in accordance with the present invention.

Referring to FIG. 5, a content replay process performed by the information processing apparatus and the drive device in accordance with the present invention is discussed.

A recording medium 411, such as a DVD, having a content with copyright information such as copy never information embedded as an electronic watermark therewithin is loaded in a drive device 410, such as a DVD drive device. The drive device 410 reads data from the recording medium, and outputs the read data to an information processing apparatus 420 functioning as a replay apparatus for replaying the content through a connection ATAPI interface. The data stored in the information recording medium 411 is encrypted (using CSS or DES, for example), and encoded (using MPEG2 or MPEG 4).

As already discussed, the ATAPI is used to connect a peripheral device such as a CD-ROM drive, other than hard disks, to an integrated drive electronics (IDE) or AT attachment (ATA) interface. For example, the ATAPI packetizes a command from SCSI, and hands over the packetized command to the IDE interface to control peripheral devices.

The information processing apparatus 420 for executing a replay process of a content, such as a PC, receives, from the drive device 410, the data read from the recording medium 411. The information processing apparatus 420 performs a data restoration process including a decryption process on the encrypted data, and a data decompression process on coded data, and then outputs the restored data as a content to a display, a loudspeaker, etc.

In the drive device 410, a recording medium signal processor 412 functioning as a replay unit reads data from an information recording medium 411. Using a format of the read data (DVD format), the recording medium signal processor 412 determines each data, outputting a content to the replay controller 415 while also outputting encryption key information storage data to an encryption key information detector 413.

The encryption key information detector 413 acquires, from the data read from the information recording medium 411, a key that is directly or indirectly applied to a decryption process of the encrypted content stored in the information recording medium 411.

The read key information is handed over to an authenticator and key transfer unit 414. The key information is then transferred to the information processing apparatus 420 on condition that the information processing apparatus 420 is authenticated and on condition that the authentication process with an authenticator and key transfer unit 421 is successfully completed.

A replay controller 415 in the drive device 410 outputs the content read from the information recording medium 411 to the information processing apparatus 420 through the ATAPI interface. The transferred content is the one that still remains encrypted and encoded.

A decryptor 422 in the information processing apparatus 420 performs a decryption process in accordance with the encryption format of the received content. A decompressor 423 decompresses the encoded data. The decryptor 422 receives the key transferred to the information processing apparatus 420 from the authenticator and key transfer unit 421 on condition that the mutual authentication is established, and performs a decryption process using the input key. For example, if the input content is CSS processed MPEG2 content, the decryptor 422 in the information processing apparatus 420 receives a input CSS key from the authenticator and key transfer unit 421, and performs the decryption process using the input key. The decompressor 423 decodes the MPEG2 content, and a baseband signal of the content results.

The baseband signal acquired as a result of the decompression process is output to a display, a loudspeaker, etc. while being output to the electronic watermark detection pre-processor 424. To reduce the amount of data to be fed back to the drive device 410, the electronic watermark detection pre-processor 424 extracts a luminance signal, for example, and reduces a sampling rate of the baseband signal to reduce the size of a screen to remove excessively high frequency components. Furthermore, the electronic watermark detection pre-processor 424 removes unwanted low-frequency components by causing the baseband signal to pass through a high-pass filter to convert the 8-bit information into 2-bit information. Only data required to detect the electronic watermark detection process is thus obtained. Furthermore, signal processing such as Fast Fourier Transform (FFT) is performed depending on the electronic watermark detection method of the electronic watermark detector 430. A transmission data confidentializer 425 performs a confidentilization process on the processed data. The confidentialization process is an encryption process intended to protect the transmission data from tapping through an interface. This encryption process is performed using key information (such as a session key) shared by the drive device 410 and the information processing apparatus 420.

The feedback data for the electronic watermark detection is sent from the information processing apparatus 420 to the drive device 410 through the ATAPI interface in a secure manner.

To return the data from the information processing apparatus 420 functioning as a host for replaying a content to the drive device 410, a different path rather than the ATAPI interface may be used. For example, it is contemplated that a baseband signal such as an NTSC obtained subsequent to the decoding process in the host is sent as is to the drive device through a signal line. However, if the feedback data is transferred through a path different from the path of the content data, the baseband signal acquired as a result of replay is recorded onto the HDD. For a second and subsequent replay, the baseband signal already recorded on the HDD rather than the baseband signal obtained during the replay process can be transferred to the drive device.

The output path of the content output from the drive device set to be different from the input path of the feedback data to the drive device permits a pretending action in which predetermined other data is set as the feedback data. The regular replay control process may be thus impeded. For example, the information processing apparatus as a host receives a copy-never content from the drive device for replay. The information processing apparatus reads the baseband signal acquired during replay of a copy-free content from the HDD, and returns the read baseband signal as the feedback signal. In this way, it is possible to cause the drive device to mistake a copy-free content for the baseband signal during the electronic watermark detection.

In accordance with the present invention, the output process for outputting the content from the drive device 410 to the information processing apparatus 420 and the input process for inputting the electronic watermark detection data from the information processing apparatus 420 to the drive device 410 use the same data transfer path of the common ATAPI interface. Since a disconnection of the path for returning the data to the drive device means a disconnection of the data outputting path in this arrangement, a pretending action is obviated. The data outputting from the drive device to the information processing apparatus performing the content replaying and the feedback data inputting to the drive device from the information processing apparatus take the same signal connection path in communication.

A received data restoration processor 416 in the drive device 410 decrypts the received data, acquires pre-processed data from the baseband signal, namely, the electronic watermark detection signal. The received data restoration processor 416 then outputs the pre-processed data to the electronic watermark detector 430.

An electronic watermark detector 430 detects an electronic watermark from the pre-processed data derived from the baseband signal, and inputs the result of electronic watermark detection to a replay controller 415. The replay controller 415 determines whether to continue or quit the transfer of the content based on the input electronic watermark information.

Figure 6:
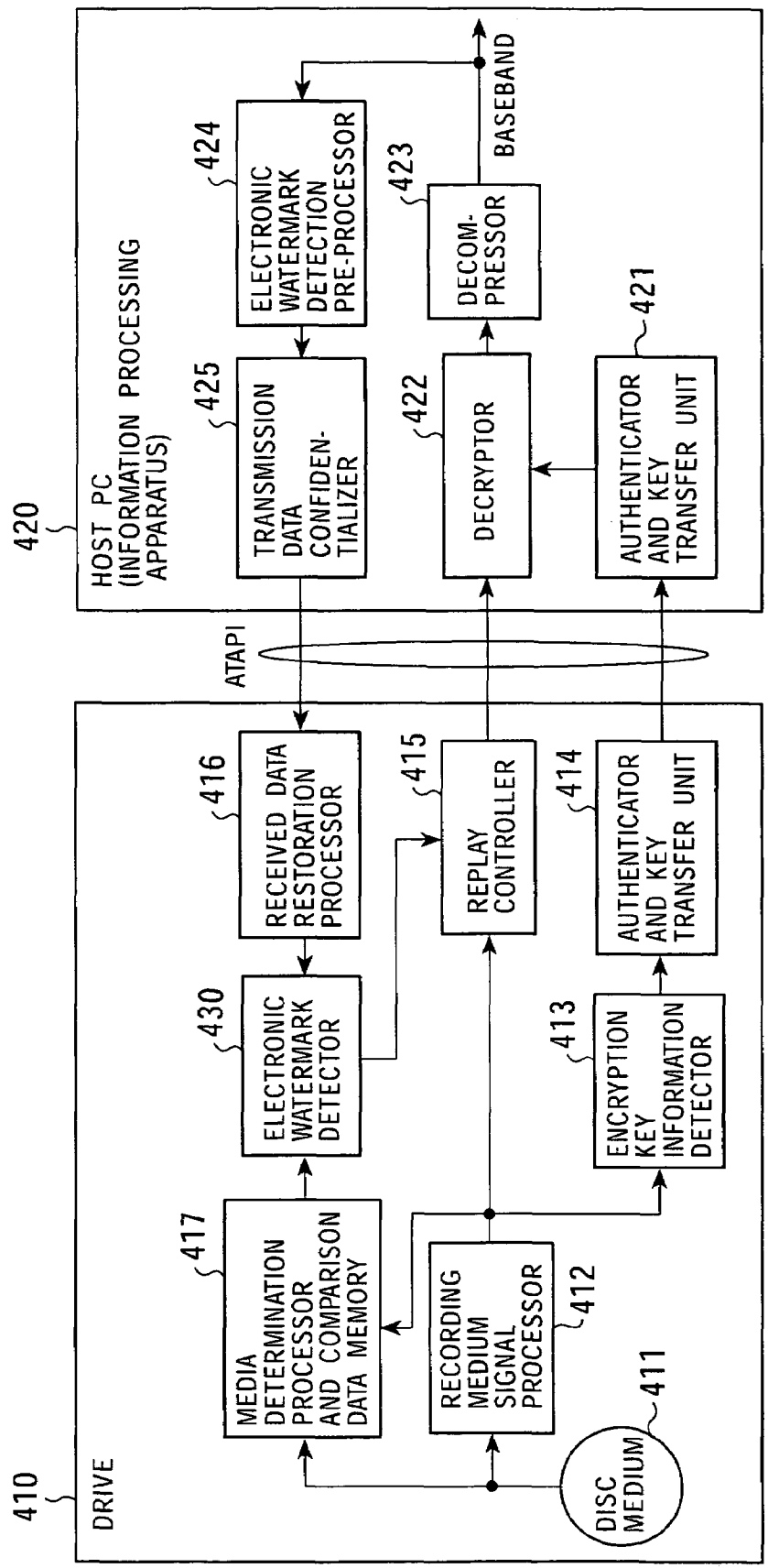
FIG. 6 illustrates the operation of a drive device and an information processing apparatus in the replay control process based on the electronic watermark detection process in accordance with the present invention.

Referring to FIG. 6, the drive device 410 may be provided with a media determination processor and comparison data memory 417. The media determination processor and comparison data memory 417 performs a media determination process for determining a recording medium type as to whether the medium is an ROM or other recordable disk, and stores the result of determination therewithin. The media determination processor and comparison data memory 417 may also contain a memory area for storing information to be detected as electronic watermark information.

In the content replay control process, the drive device 410 determines whether to continue or quit data outputting to the information processing apparatus 420 as a replay apparatus, based on both the result of the recording medium type determination process for determining whether or not the information recording medium is an ROM type permitting no data writing, and the result of the electronic watermark detection provided by the electronic watermark detector 430. The replay control process will be discussed in detail later.

Figure 7:
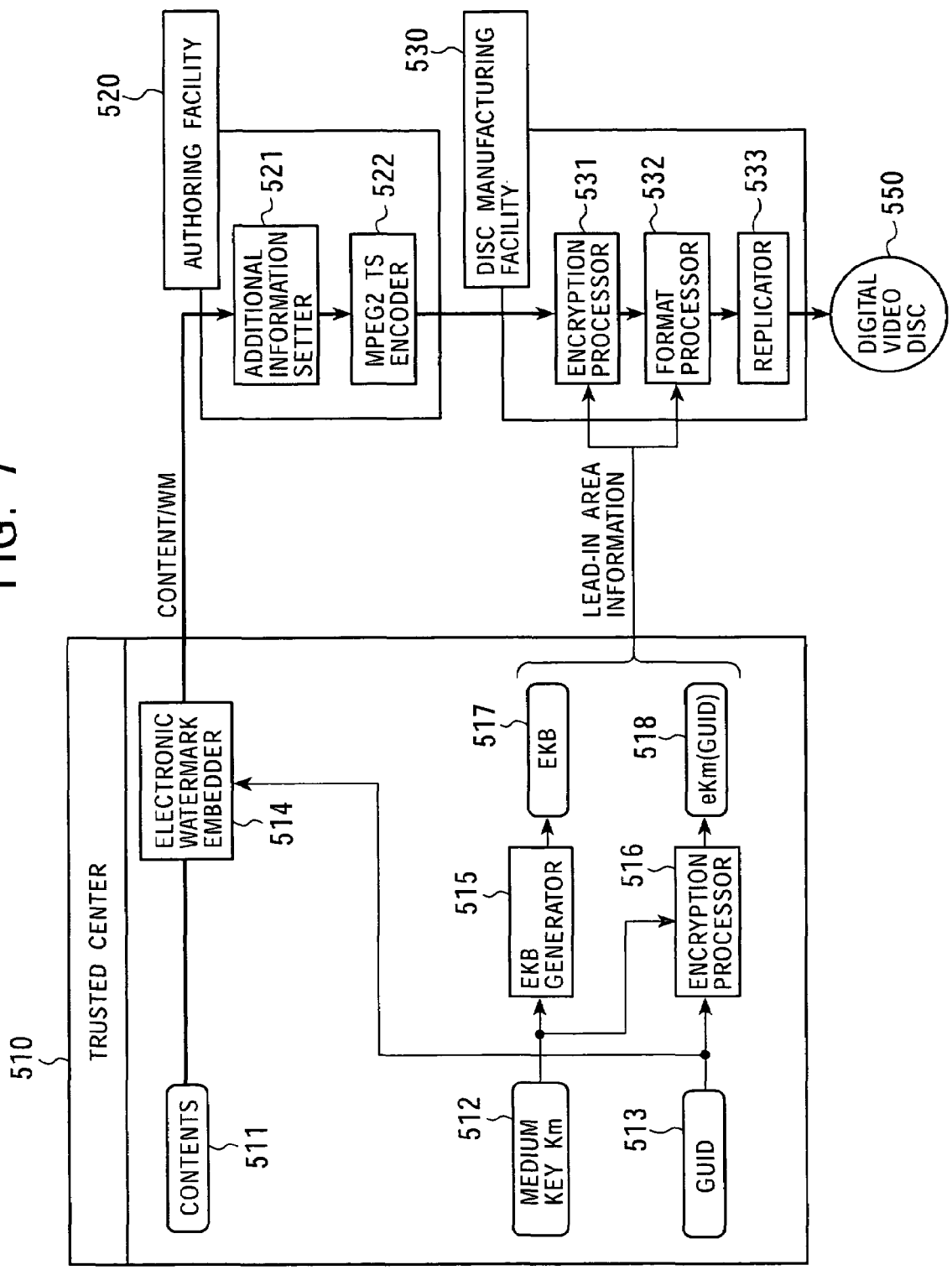
FIG. 7 illustrates a manufacturing process of an information recording medium that is used in the replay control process based on the electronic watermark detection process in accordance with the present invention.
Figure 8:
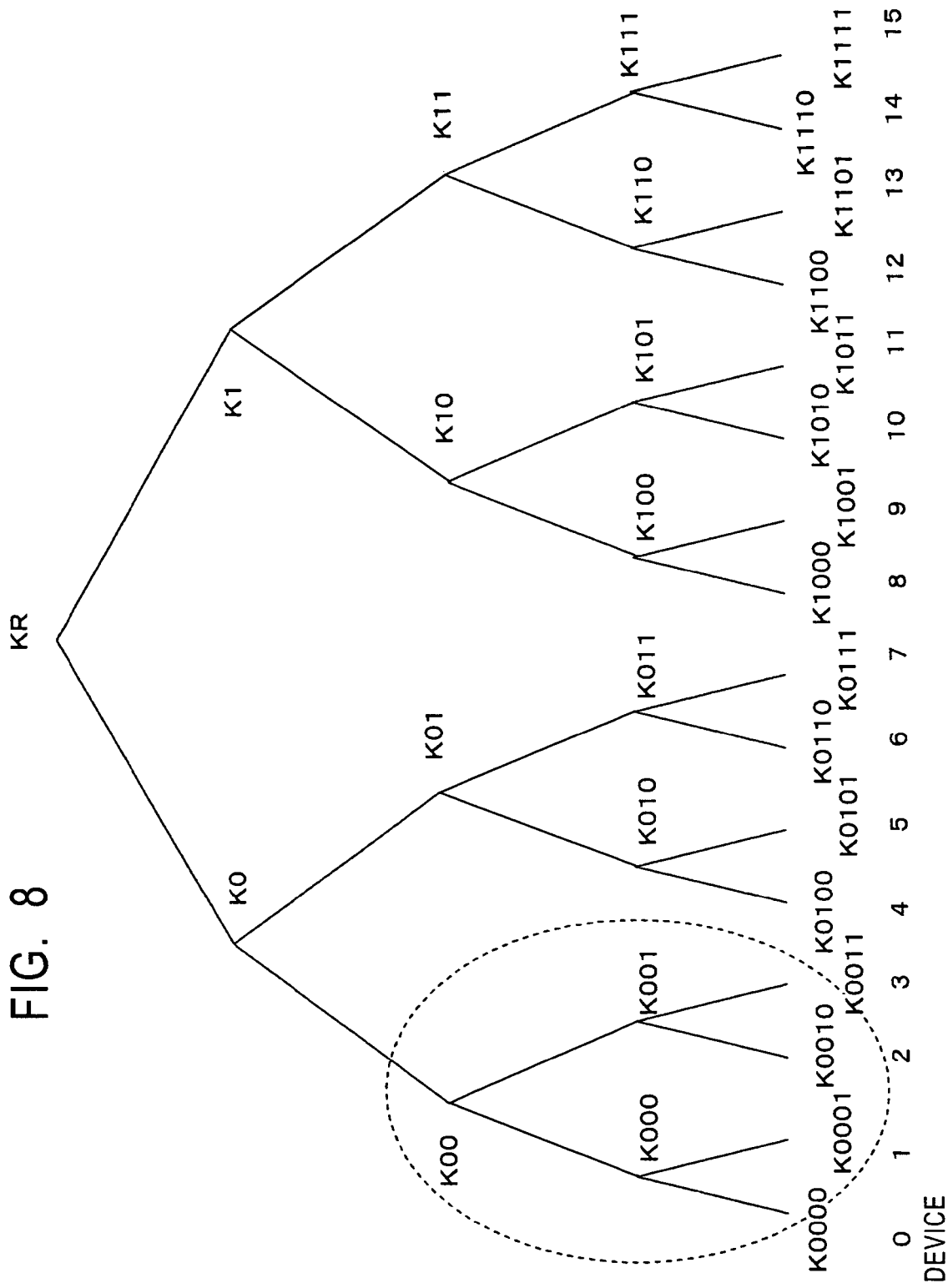
FIG. 8 illustrates a hierarchical tree structure that is applied to an encryption process and a distribution process of various keys and data.

Referring to FIGS. 7 and 8, a manufacturing process of a medium (disk) storing a content to be replayed by the drive device and data stored in the medium will now be discussed.

FIG. 7 illustrates the manufacturing process of the recording medium of an encrypted content having an electronic watermark embedded therewithin as copyright information.

Three entities are used in the manufacture of the content recording medium. A first is a trusted center 510 for managing copyright of contents. A second is a authoring facility 520 for editing the contents. A third is a disk manufacturing facility 530 for recording, on a disk, the data edited by the authoring facility 520 to manufacture the disk.

The trusted center 510 performs the copyright management of the contents. The trusted center 510 embeds the electronic watermark information into an original content 511, and generates an EKB 517 as key information for use in the encryption process or the decryption process of the content. The EKB 517 is a encryption key block into which a medium key 512 required for the decryption of the content is encrypted, and is referred to as an enabling key block (EKB).

The decryption of the EKB, based on a device key stored in an information processing apparatus of a user holding an effective license, allows the user to acquire a medium key 512 for decrypting the content. Based on the acquired medium key 512, a key applied to the decryption of the encrypted content is generated.

The EKB generator 515 allows the user to acquire a key based on the effectiveness of the license of a user device (information processing apparatus) through an information distribution system of a hierarchical tree structure, and prevents a user device (disabled in a revoke process) from acquiring the (medium) key. Upon finding an unauthorized device, the trusted center 510 generates an updated EKB 517 that disables the unauthorized device from acquiring the media key, and provides the updated EKB 517 corresponding to the encrypted content. The access by the unauthorized device is thus obviated.

The encrypted data providing process for providing an encryption key using the hierarchical structure is discussed with reference to FIG. 8. Numbers 0-15 appearing at the bottom level of the tree structure in FIG. 8 are user devices as the information processing apparatuses using the contents. In other words, each leaf of the hierarchical tree structure shown in FIG. 8 represents a device.

Each of the devices 0-15 stores in a memory thereof a key set (device node key or DNK) formed of node keys assigned to leaves from own node to the root of the hierarchical tree structure, and own leaf key.

Referring to FIG. 8, K0000-K1111 at the bottom level are leaf keys respectively assigned to devices 0-15, and a root key (KR) at the top level of the tree to keys at the second level from the bottom level, KR to K1111 are node keys.

In the hierarchical tree structure of FIG. 8, the device 0 has the leaf key K0000, and node keys K000, K00, K0, and KR. The device 5 has keys K0101, K010, K01, K0, and KR. The device 15 has keys K111, K111, K11, K1, and KR. The hierarchical tree structure of FIG. 8 having 16 devices 0-15 only is a bilaterally symmetrical, four level structure. It is also perfectly acceptable that more devices are incorporated in the tree structures with different levels arranged from branch to branch.

Arranged in the hierarchical tree structure of FIG. 8 may be a variety of types of devices including devices having recording media, such as DVD, CD, MD, embedded therewithin or detachably loaded thereto, or a device using a flash memory. Furthermore, a variety of application services are available in a mixed manner. The hierarchical tree structure of FIG. 8, namely, a distribution system of contents or keys, includes different devices and different applications in a mixed way.

In such a system where a variety of types of devices and application software programs coexist, devices enclosed in a broken loop, namely, devices 0, 1, 2, and 3 constitute a single group that uses the same recording medium. For example, the devices 0, 1, 2, and 3 enclosed in a broken loop are supplied with a common content that is encrypted and provided by a provider through a network or in a CD, and are supplied with a key commonly used by the devices. Each device may outputs payment data for an encrypted content to a provider or a bank. An entity, such as a content server, a license server, a shop server, etc. sends data to the devices 0, 1, 2, and 3 enclosed by a broken loop in FIG. 8 as a group at a time. A plurality of such groups is present in the hierarchical tree structure of FIG. 8.

The node keys and leaf keys may be managed by a management system having a single trusted center function. The node keys and leaf keys are managed on a group by group basis by a message data distribution unit such as a provider or a bank that exchanges data with each group. In the case of the leak of a key, the node keys and the leaf keys are updated. The update process may be performed by a management system having a key management center function, a provider, a bank, or the like.

In the hierarchical tree structure of FIG. 8, each of the four devices 0, 1, 2, and 3 contained in the same group has device node keys (DNKs) including common keys K00, K0, and KR.

For example, taking advantage of the shared common keys, a common key is provided to the devices 0, 1, 2, and 3 only. For example, the node key K00 is commonly shared by the devices 0, 1, 2, and 3. A value Enc (K00, Knew) that is obtained by encrypting a new key Knew with the node key K00 is distributed to the devices 0, 1, 2, and 3 via a network or in a recording medium. In this case, the devices 0, 1, 2 and 3 only can acquire the new key Knew by decrypting the encryption Enc(K00, Knew) using the common node key K00 shared by these devices. Here, for example, a format Enc (Ka, Kb) represents data that is obtained by encrypting Kb with Ka.

If it is found at point of time "t" that the keys K0011, K001, K00, K0, and KR held by the device 3 are examined and cracked by a hacker, the device 3 must be isolated from a system (the group of the devices 0, 1, 2, and 3) to protect data exchanged among the system thereafter. To this end, the node keys K001, K00, K0, and KR are updated to K(t)001, K(t)00, K(t)0, and K(t)R, respectively, and the devices 0, 1, and 2 must be notified of the updated keys. Here, a format K(t)aaa represents an update key of a generation: t of the key Kaaa.

The distribution process of the update key is now discussed. The key updating is performed by supplying the devices 0, 1, and 2 with a table formed of block data called enabling key block (EKB) shown in FIG. 9A through a network or in a recording medium. The EKB is constructed of an encryption key for distributing a newly updated key to a device corresponding to a leaf forming the hierarchical tree structure of FIG. 8. The EKB is also referred to as a key renewal block (KRB).

The EKB shown in FIG. 9A is block data that has a data structure in which only a device requiring node key updating is updated. The EKB shown in FIG. 9A is block data that is organized to distribute update node keys of generation "t" to the devices 0, 1, and 2 in the hierarchical tree structure of FIG. 8. As shown in FIG. 8, the device 0 and the device 1 need K(t)00, K(t)0, and K(t)R as the update node keys, and the device 2 needs K(t)001, K(t)00, K(t)0, and K(t)R as the update node keys.

The EKB shown in FIG. 9A contains a plurality of encryption keys. The encryption key at the bottom row is Enc (K0010, K(t)001). This encryption key is an update node key K(t)001 that has been encrypted using the leaf key K0010 held by the device 2. The device 2 can acquire K(t)001 by decrypting the encryption key with the leaf key of its own. The encryption key Enc(K(t)001, K(t)00) at the second row from the bottom in FIG. 9A is decrypted using K(t)001 acquired through the encryption process. The update node key K(t)00 results. Successively, an encryption key Enc(K(t)00, K(t)0) at the second row from the top in FIG. 9A is decrypted, resulting in an update node key K(t)0, and an encryption key Enc(K(t)0, K(t)R) at the top row in FIG. 9A is decrypted, resulting in K(t)R.

Devices K0000 and K0001 do not need the node key K000 to be updated, but need K(t)00, K(t)0, and K(t)R as update node keys. The devices K0000 and K0001 decrypt an encryption key Enc(K000, K(t)00) at a third row from the top in FIG. 9A, resulting in K(t)00. The devices K0000 and K0001 decrypt an encryption key Enc(K(t)00, K(t)0) at a second row from the top in FIG. 9A, thereby resulting in an update node key K(t)0. The devices K0000 and K0001 decrypt an encryption key Enc(K(t)0, K(t)R) at the top row in FIG. 9A, thereby resulting in an update node key K(t)R. In this way, the devices 0, 1, and 2 acquire an update key K(t). Indexes in FIG. 9A represent absolute addresses of node keys and leaf keys used as decryption keys.

If the node keys K(t)0 and Kt(t)R at the top row in the hierarchical tree structure of FIG. 8 require no updating but the node key K00 only requires updating, the enabling key block of FIG. 9B may be used. The update node key K(t)00 is thus distributed to the devices 0, 1, and 2.

When a medium key Km that can be acquired by a particular group only is distributed, the EKB shown in FIG. 9B may be used. More specifically, the medium key Km usable by the devices 0, 1, 2, and 3 in the group enclosed by a broken loop in FIG. 8 is now distributed. Data Enc(K(t)00, K(t)m) is obtained by encrypting a new medium key using the node key K(t)00 updated from the node key K00 common to the devices 0, 1, 2, and 3. The data Enc(K(t)00, K(t)m) is distributed together with the EKB shown in FIG. 9B. The data thus distributed cannot be decrypted by a device in another group, such as a device 4.

By decrypting an encrypted text with K(t)00 that is obtained by processing the EKB, the devices 0, 1, and 2 obtain the medium key K(t)m at point of time "t", appropriate for use in the encryption and decryption process of a content.

Figure 10:
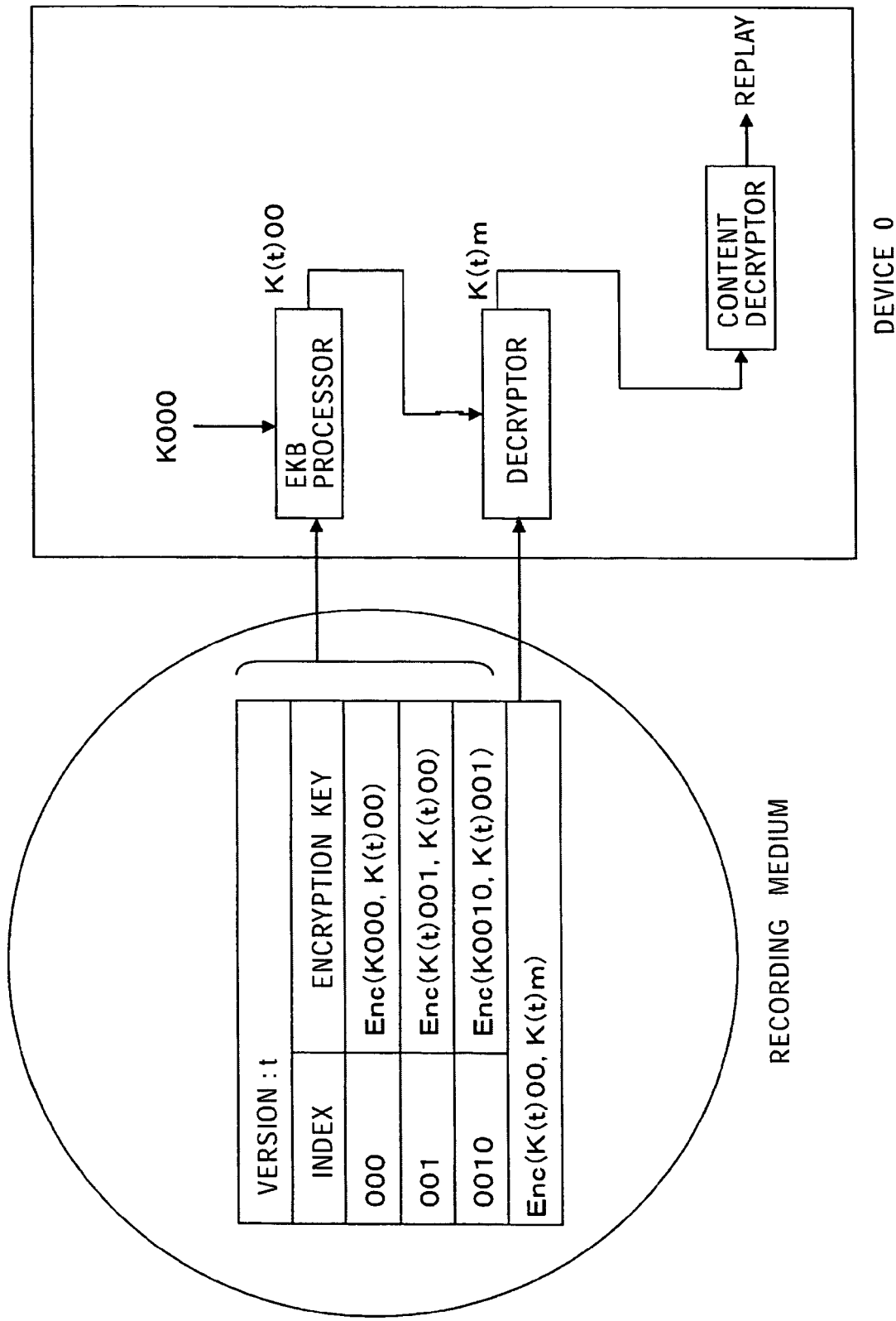
FIG. 10 illustrates a distribution process and a decryption process, each using the EKB of a content key.

FIG. 10 illustrates a process of acquiring, in the EKB process, the medium key K(t)m at point of time "t" appropriate for use in the content encryption and decryption process. The EKB now holds the data Enc(K(t)00, K(t)m) that is obtained by encrypting the medium key K(t)m with K(t)00, and the data listed in the table of FIG. 9B. Here, the process of the device 0 is discussed.

As shown in FIG. 10, the device 0 generates the node key K(t)00 by performing the same EKB process as the one described above, using the EKB at the generation "t" stored in the recording medium and the node key K000 stored beforehand therewithin. The encrypted data Enc(K(t)00, K(t)m) is decrypted using the update node key K(t)00 and the update medium key K(t)m is thus acquired.

In another example, a device needs no updating of the node keys in the hierarchical tree structure but needs only the medium key K(t)m at point of time "t". In such a case, the following method is contemplated.

The medium key K(t)m is transferred to only the devices 0, 1, and 2 in the same manner as in FIG. 8. The EKB is as follows:

| Version: t | |
|---|---|
| Index | Encryption Key |
| 000 | Enc(K000, K(t)m) |
| 0010 | Enc(K0010, K(t)m) |

The devices 0 and 1 acquire a content key by decrypting one of the encrypted texts of the EKB using K000, and the device 2 acquires a content key by decrypting one of the encrypted texts of the EKB using K0010. Although this method does not update the node keys, a content key is effectively fed to a device in need thereof. In other words, this method decreases the number of encrypted texts contained in the EKB, thereby reducing the size of the EKB, and thereby leading to a reduction in the number of encryptions in the trusted center and a reduction in the number of decryptions in each device.

Referring again to FIG. 7, the manufacturing process of the content storage medium (disk) is discussed. The electronic watermark embedder 514 in the trusted center 510 embeds a globally unique identification GUID 513 of the content as the electronic watermark information in the content 511. Although the GUID 513 is shown as a single piece of information in FIG. 7, other various information is also embedded as the electronic watermark information. The content having the electronic watermark information embedded therewithin is transferred to the authoring facility 520.

The EKB generator 515 in the trusted center 510 generates the EKB 517 holding the medium key Km 512 required in the decryption process of the encrypted content stored in the disk. The trusted center 510 encrypts the GUID 513 embedded as a content with the medium key Km 512, thereby generating the encrypted GUID:eKm(GUID). Here, a format eA(B) represents the data that is obtained by encrypting data "B" with a key "A".

The EKB 517 holding the medium key Km 512 generated by the trusted center 510 and the GUID:eKm(GUID) encrypted with the medium key Km 512 are handed over to the disk manufacturing facility 530 as lead-in area information to be stored in a lead-in area.

The authoring facility 520 is now discussed. The additional information setter 521 in the authoring facility 520 sets various information relating to the content, such as title information and menu information of the content 511, to the electronic watermark embedded content received from the trusted center 510. An MPEG2 TS encoder 522 performs an encoding process on the electronic watermark embedded content having the additional information attached thereto, thereby generating an MPEG 2 transport stream (TS).

The transport stream includes a plurality of programs in a stream, and having an arrival time stamp (ATS) set therewithin as appearance timing information of each transport packet. The time stamp is determined in the encryption process not to destroy a transport stream system target decoder (T-STD) functioning as a virtual decoder defined in the MPEG-2 system. During the replay of the stream, the decryption and replay are performed by controlling appearance timing in accordance with the ATS attached to each transport packet.

When the transport stream packet is recorded onto a recording medium, the transport stream packet is recorded as a source packet without spacing between packets. By recording the appearance timing of each packet together onto the recording medium, the output timing of each packet is controlled during the replay.

The transport stream produced in the authoring facility 520 is handed over to a disk manufacturing facility 530. An encryption processor 531 in the disk manufacturing facility 530 performs an encryption process on various information stored in the disk.

Figure 11:
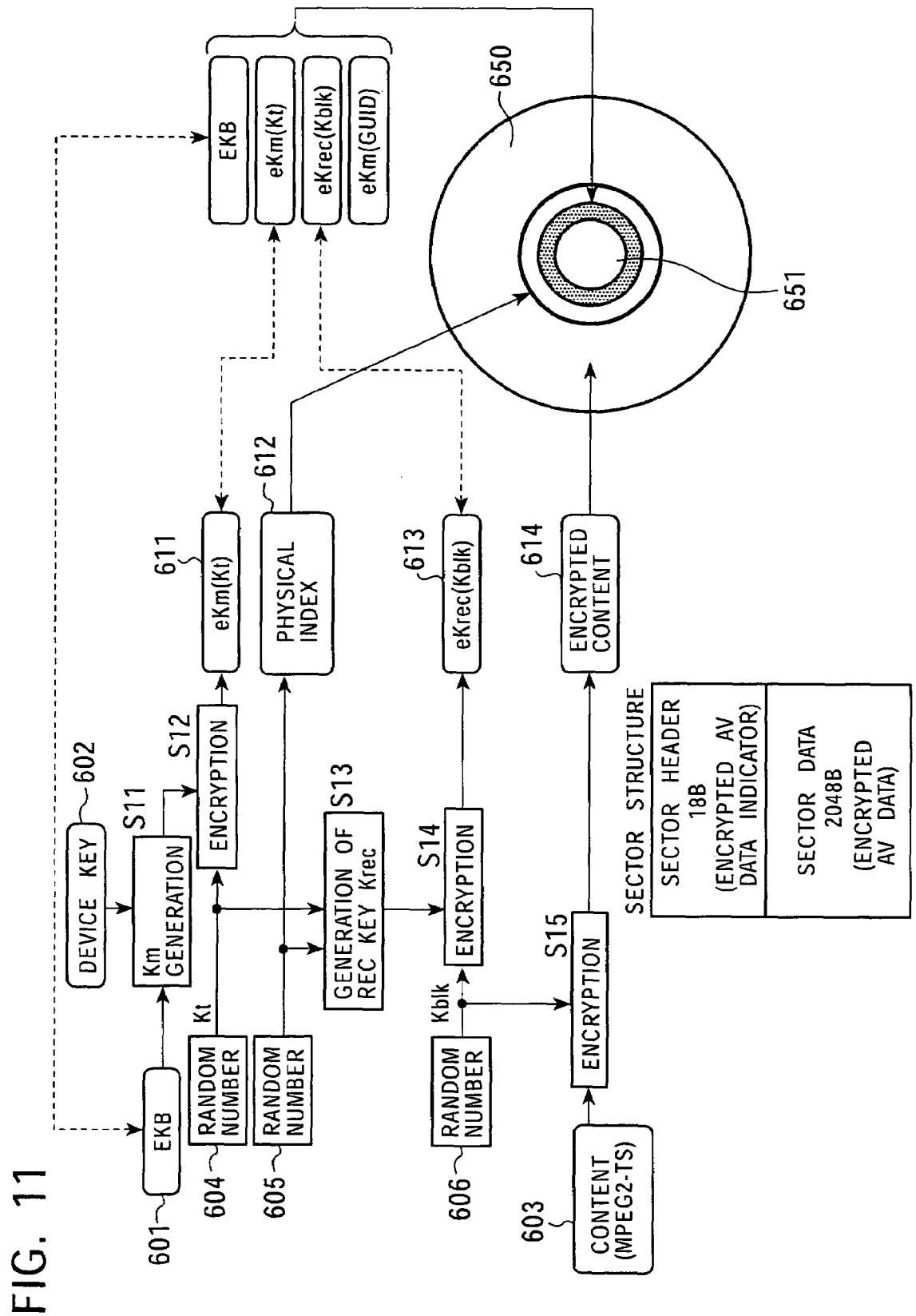
FIG. 11 illustrates a data structure of data stored in an information recording medium.

Referring to FIG. 11, the process performed by the encryption processor 531 in the disk manufacturing facility 530 is discussed.

In the decryption process, the disk manufacturing facility 530 applies a device key 602 provided by the trusted center 510 to the medium key stored EKB received beforehand from the trusted center 510, thereby producing a medium key Km (step S11).

A random number 604 generated in a random number generation operation is set as a title key Kt. The title key Kt is encrypted with the medium key Km, thereby becoming an encrypted title key eKm(Kt) 611. Here, any of various algorithms such as DES or AES may be used as an encryption process algorithm. The encrypted title key eKm(Kt) 611 is written onto a lead-in area 651 of an information recording medium 650.

A random number 605 generated in a random number generation operation is set as a physical index 612. The physical index 612 is encrypted with the title key Kt, thereby becoming a recording key (Krec) (step S13). The physical index 612 is written onto the information recording medium 650 without being encrypted.

A random number 606 generated in a random number generation operation is set as an encryption key for each block, which is a unit of content encryption process, namely, set as a block key Kblk. The block key Kblk is encrypted with the recording key Krec generated in step S13, thereby becoming an encrypted block key eKrec(Kblk) 613. The encrypted block key eKrec(Kblk) 613 is written onto the lead-in area 651 of the information recording medium 650.

The content (MPEG2 transport stream) input from the authoring facility 520 is encrypted with the random number 606, i.e., the block key Kblk, thereby becoming an encrypted content. The resulting encrypted content is written onto the information recording medium 650.

Data to be written onto the information recording medium 650 has a sector structure as shown in FIG. 11. The sector includes an eighteen byte sector head having an indicator concerning encrypted AV data and sector data having the encrypted AV data of 2048 bytes.

A format processor 532 in the disk manufacturing facility 530 of FIG. 7 sets a data recording format in accordance with the aforementioned sector structure, for example, and a replicator 533 replicates a number of digital video disks 550, each having the data in format.

Figure 12:
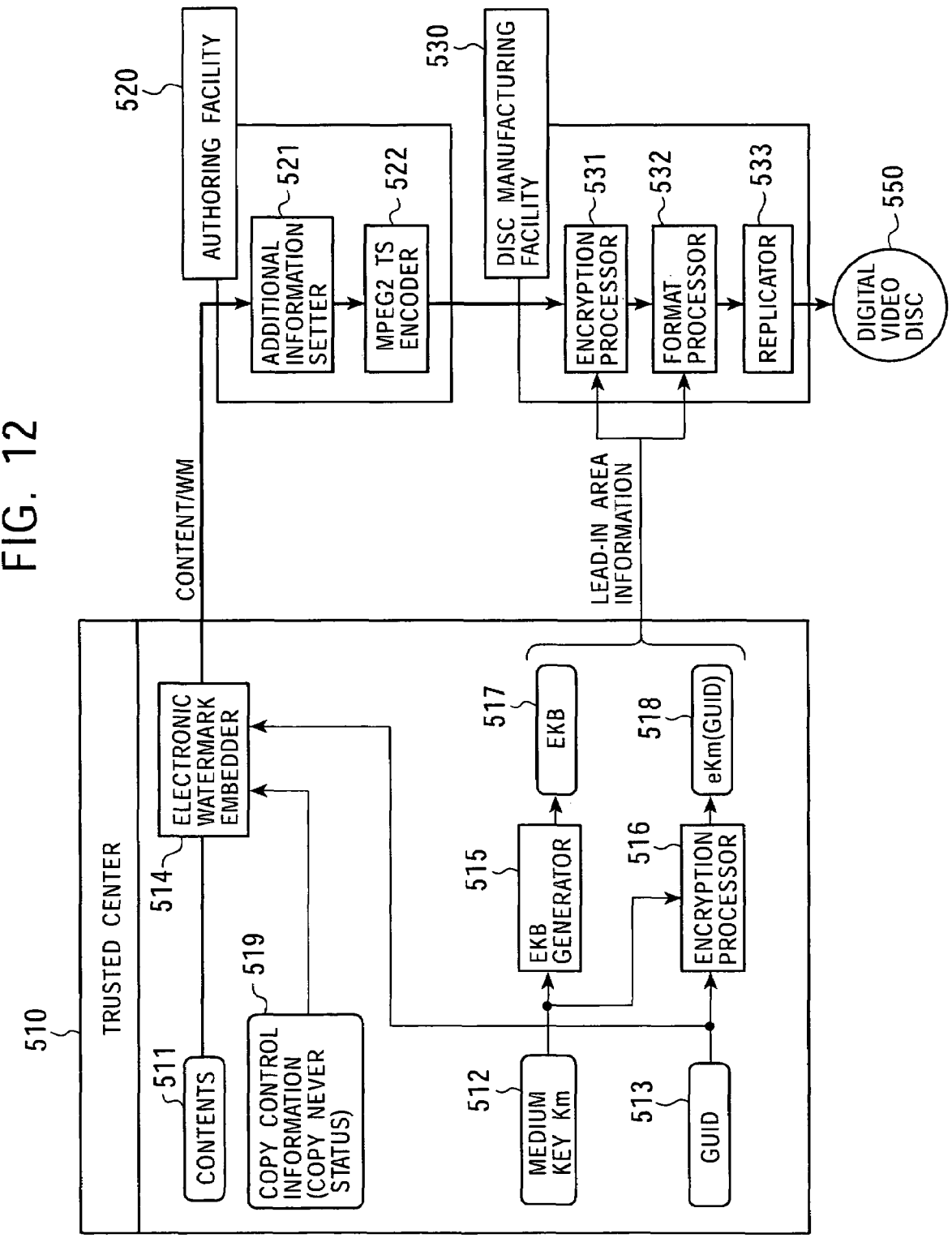
FIG. 12 illustrates a manufacturing process of an information recording medium that is used in the replay control process based on the electronic watermark detection process in accordance with the present invention.

In the example of disk manufacturing process shown in FIG. 7, the GUID as identification data corresponding to the content is the electronic watermark information embedded in the content. Referring to FIG. 12, copy control information 519 such as copy never status may be embedded together with the GUID by an electronic watermark embedder 514.

The process of the information processing apparatus (PC) is now discussed with reference to FIG. 13. The information processing apparatus performs a content replay process together with the drive device having the above-mentioned content stored disk loaded therewithin.

Figure 13:
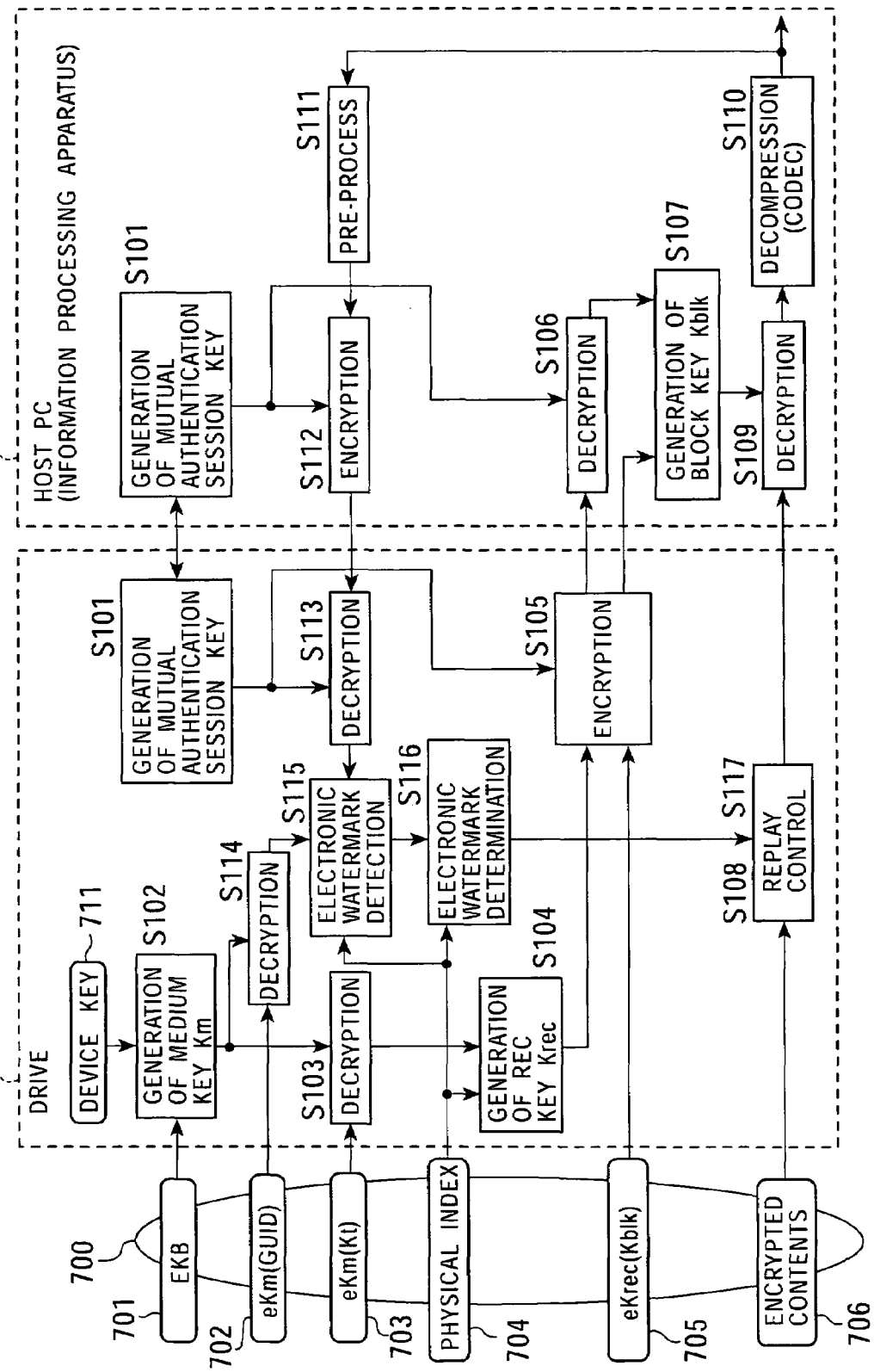
FIG. 13 illustrates the operation of a drive device and an information processing apparatus functioning as a host in the replay control process based on the electronic watermark detection process in accordance with the present invention.

FIG. 13 illustrates an information recording medium (disk) 700 manufactured in the aforementioned disk manufacturing process, a drive device 710 having the information recording medium 700 with the data thereof set in a data readable fashion, and an information processing apparatus 720 such as a PC that is a content replay apparatus connected to the drive device 710 through the ATAPI interface. The information processing apparatus 720 is connected to output devices such as a display, a loudspeaker, etc. to output a replayed content thereto, although these output devices are not shown.

The information recording medium 700 stores an EK701 as an encoding key block as a medium key, an encrypted GUID:eKm(GUID) 702 that is obtained by encrypting the globally unique identifier GUID with the medium key Km, an encrypted title key Km(Kt) 703 that is obtained by encrypting the title key Kt with the medium key Km, a physical index 704, an encrypted block key eKrec(Kblk) 705 that is obtained by encrypting the block key Kblk with the recording key Krec, and an encrypted content 706 that is obtained by encrypting the content with the block key Kblk.

The drive device 710 also stores a device key 711 distributed by the trusted center. The device key 711 is used to acquire the medium key by decrypting the EKB. The drive device 710 and the information processing apparatus 720 share a common authentication key (not shown) to perform a mutual authentication process.

Referring to FIG. 13, a content replay sequence will now be discussed. In step S101, a mutual authentication process and a session key generation process are performed between the drive device 710 and the information processing apparatus 720. It is sufficient if these processes are performed when a connection is established between the drive device 710 and the information processing apparatus 720, when the information recording medium 700 is loaded into the drive device 710, or when a replay start request is input through an input unit to the information processing apparatus 720.

Figure 14:
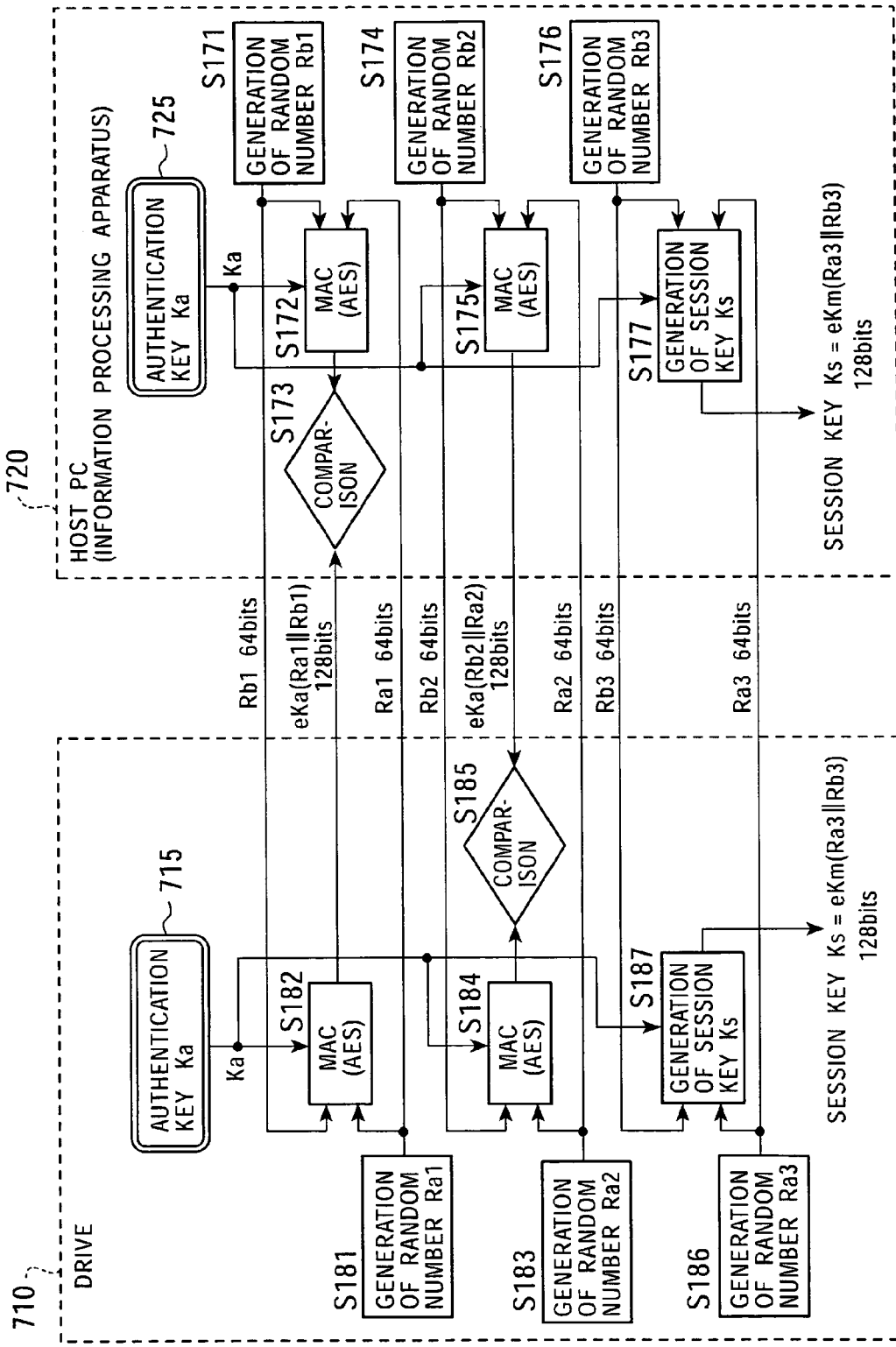
FIG. 14 illustrates an authentication process performed between the drive device and the information processing apparatus functioning as a host.

A mutual authentication sequence will now be discussed with reference to FIG. 14. An authentication sequence and a session sharing sequence shown in FIG. 14 are performed in accordance with a common key processing method. The authentication sequence and the session key sharing sequence are not limited to the processes discussed here, and may take different processes.

The drive device 710 and the information processing apparatus 720 have authentication keys Ka715 and Ka725, respectively. In step S171, the information processing apparatus 720 generates a random number Rb1 (64 bits), and sends the random number Rb1 to the drive device 710. The drive device 710 generates a random number Ra1 in step S181, and then generates a message authentication code (MAC) to combination data of the random number Ra1 and the random number Rb1, the combination data being represented as [Ra1||Rb1]. The generated MAC value is eKa(Ra1||Rb1). Here, a format A||B represents a linking of data A and data B. The drive device 710 sends the generated MAC value eKa(Ra1||Rb1) and the generated random number Ra1 to the information processing apparatus 720.

In step S172, the information processing apparatus 720 calculates the MAC value eKa(Ra1||Rb1) in response to the random number Ra1 received from the drive device 710, and the random number Rb1 generated in step S171. In step S173, the information processing apparatus 720 compares the calculated MAC value with the MAC value received from the drive device 710. If the two MAC values match each other, the information processing apparatus 720 determines that the drive device 710 is an authentic device having an authorized authentication key. If the two MAC values fail to match each other, the information processing apparatus 720 determines that the authentication process is in error. The subsequent process is quit.

In step S174, the information processing apparatus 720 generates a random number Rb2 and sends the random number Rb2 to the drive device 710. In step S183, the drive device 710 generates a random number Ra2, and sends the random number Ra2 to the information processing apparatus 720.

In step S175, the information processing apparatus 720 calculates a MAC value eKa(Ra2||Rb2) and sends the MAC value eKa(Ra2||Rb2) to the drive device 710.

In step S184, the drive device 710 calculates a MAC value eKa(Ra2||Rb2) in response to the received random number Rb2 and the random number Ra2 generated in step S183. In step S185, the drive device 710 compares the calculated MAC value with the MAC value received from the information processing apparatus 720. If the two MAC values match each other, the drive device 710 determines that the information processing apparatus 720 is an authentic device having a authorized authentication key. If the two MAC values fail to match each other, the drive device 710 determines that the authentication process is in error, and quits a subsequent process.

In step S176, the information processing apparatus 720 generates and sends a random number Ra3 to the drive device 710.

In step S186, the drive device 710 generates a random number Ra3. In step S187, the drive device 710 performs an encryption process using a shared authentication key Ka applied to the link data of the random number Ra3 and the random number Rb3 from the information processing apparatus 720. The drive device 710 thus calculates a session key Ks=eKa(Ra3||Rb3).

In step S177, the information processing apparatus 720 performs an encryption process using a shared authentication key Ka applied to the link data of the generated random number Rb3 and the random number Ra3 from the drive device 710. The information processing apparatus 720 thus calculates a session key Ks=eKa(Ra3||Rb3).

In the aforementioned process, the information processing apparatus 720 and the drive device 710 mutually authenticate each other as being an authentic device, and then share the session key Ks=eKa(Ra3||Rb3). Step S101 in FIG. 13 corresponds to the process that has been discussed with reference to FIG. 14.

Referring again to FIG. 13, the content replay process is discussed further. If a mutual authentication process is successfully compete between the information processing apparatus 720 and the drive device 710 with the session key shared by each other, the drive device 710 reads an EKB 701 from the information recording medium 700 in step S102. The drive device 710 performs an EKB process (for decryption) using the device key 711 stored in the information recording medium 700, thereby acquiring the medium key Km.

In step S103, the drive device 710 decrypts the encrypted title key Km(Kt) 703 read from the information recording medium 700 using the medium key, thereby acquiring the title key Kt. In step S104, the drive device 710 encrypts the physical index 704 read from the information recording medium 700 with the title key Kt, thereby generating the recording key Krec.

In step S105, the drive device 710 encrypts both the recording key Krec and the encrypted block key eKrec(Kblk) read from the information recording medium 700 with the session key Ks that is shared by the information processing apparatus 720 and the drive device 710 in the mutual authentication process. The drive device 710 then sends the encryption result to the information processing apparatus 720. Superficially, eKs(Krec) and eKs(eKrec(Kblk)) are sent from the drive device 710 to the information processing apparatus 720.

In step S106, the information processing apparatus 720 decrypts the encrypted recording key with the session key Ks, thereby acquiring the recording Krec. In step S107, the information processing apparatus 720 decrypts the encrypted block key eKs(eKrec(Kblk)) using the session key eKs and the recording key Krec, thereby acquiring the block Kblk.

In step S108, the drive device 710 sends the encrypted content 706 read from the information recording medium 700 to the information processing apparatus 720. In step S109, the information processing apparatus 720 decrypts the received encrypted content with the block key Kblk. In step S110, a codec of the information processing apparatus 720 performs a data decompression process on encoded data such as MPEG-2, and outputs the decrypted content to the output unit such as the display.

The information processing apparatus 720 generates the feedback data to cause the drive device 710 to perform the electronic watermark detection process on the decrypted content. In step S111, the information processing apparatus 720 performs a pre-process such as feature data extraction or data conversion for the electronic watermark detection. In step S112, the information processing apparatus 720 encrypts the feedback data with the session key Ks, and sends the encrypted feedback data to the drive device 710.

In step S113, the drive device 710 decrypts the feedback data received from the information processing apparatus 720 with the session key Ks, and detects an electronic watermark.

Here, the GUID is stored as the electronic watermark information. To detect the electronic watermark, the drive device 710 reads the encrypted GUID 702 from the information recording medium 700 in step S114, decrypts the encrypted GUID 702 with the medium key Km previously acquired from the EKB, and then acquires the GUID.

In step S115, the drive device 710 determines, based on the acquired GUID data, whether the GUID is contained as the electronic watermark in the content data fed back from the information processing apparatus 720. The GUID data acquired from the information recording medium 700 is used to detect correlation in the detection of the electronic watermark. In step S116, the drive device 710 performs an electronic watermark determination process based on the detection result. In step S117, the drive device 710 performs a replay control process based on the determination result, namely, continues or quits the content outputting.

Figure 15:
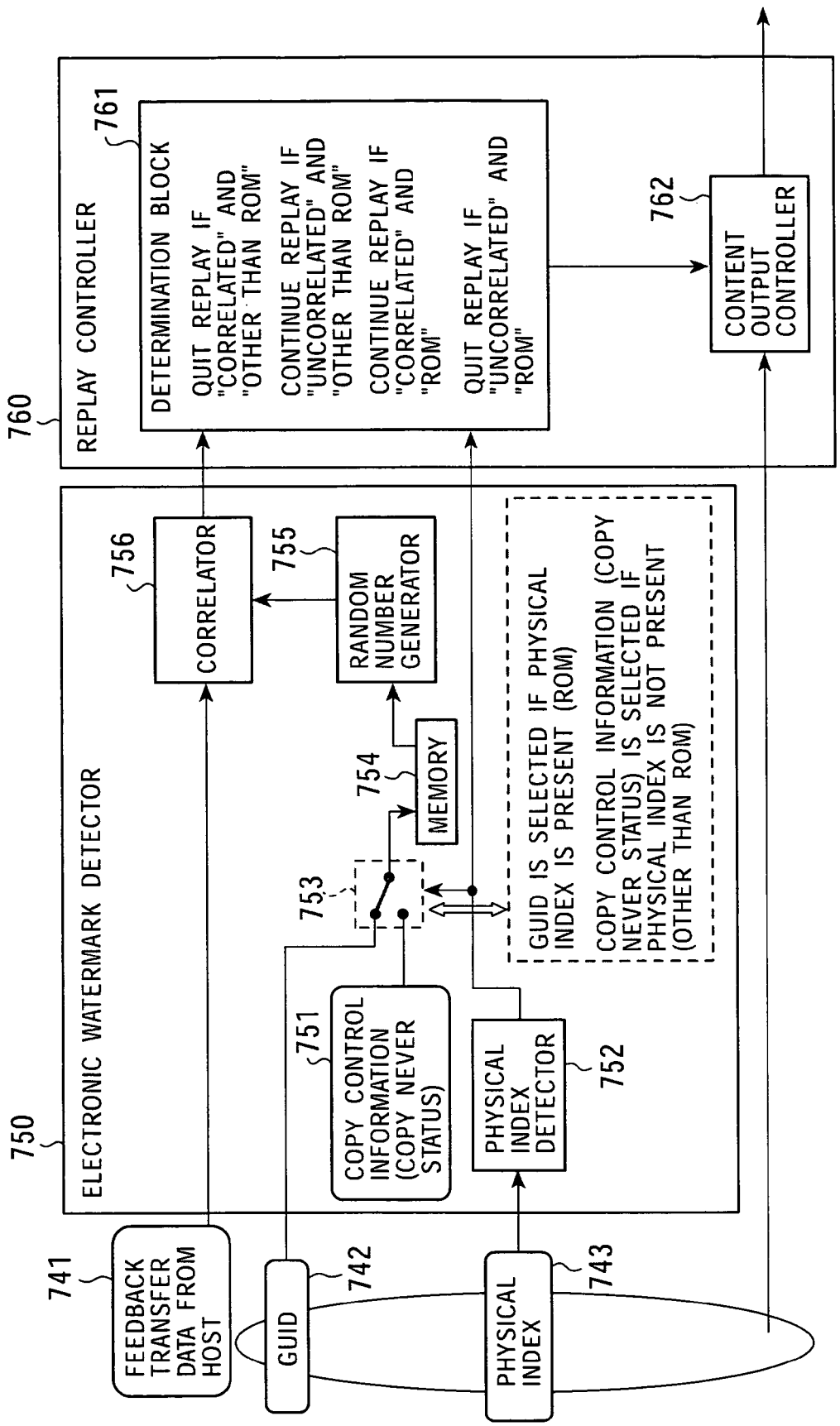
FIG. 15 illustrates an electronic watermark detection process and a determination process based on the determination result, executed by the drive device.

Referring to FIG. 15, the electronic watermark detection process and the replay control are discussed in detail. An electronic watermark detector 750 in the drive device stores copy control information (copy never status) 751 as correlation comparison data, and a switch 753 sets which of a GUID 742 read from the information recording medium or the copy control information 751 is set to be as the correlation detection data.

The switch 753 is controlled in response to the detection result of a physical index detector 752 so that the GUID is set as the correlation detection data if the physical index is read from the information recording medium or the copy control information (copy never status) is set as the correlation detection data if no physical index is read from the information recording medium.

If the physical index is read from the information recording medium, the electronic watermark detector 750 determines that the information recording medium is an ROM type disk that has been manufactured in accordance with an authentic manufacturing process, and sets the GUID as the electronic watermark detection data. If no physical index is read from the information recording medium, the electronic watermark detector 750 determines that the information recording medium is a disk other than an ROM that stores the copied content, and sets the copy control information (copy never status) as the electronic watermark detection data.

The GUID or the copy control information (copy never status), set by the switch 753, is stored in a memory 754. A random number generator 755 generates a random number in response to data read from the memory 754. A correlator 756 correlates the generated random number and the electronic watermark information from a content 741 fed back from the information processing apparatus, and determines whether the GUID or the copy control information (copy never status) data is embedded in the content as the electronic watermark.

The determination information is output to a replay controller 760. In response to the determination result, the replay controller 760 performs the replay control, thereby continuing or quitting the outputting of the content.

The replay controller 760 includes a determination block 761 and a content output controller 762. The determination block 761 performs the following determination processes.

(1) Replaying is quit if the random number and the detected electronic watermark information are correlated (the electronic watermark is detected), and the information recording medium is other than the ROM (no physical index is present).

(2) Replaying is continued if the random number and the detected electronic watermark information are uncorrelated (no electronic watermark is detected), and the information recording medium is other than the ROM (no physical index is present).

(3) Replaying is continued if the random number and the detected electronic watermark information are correlated (the electronic watermark is detected), and the information recording medium is the ROM (the physical index is present).

(4) Replaying is quit if the random number and the detected electronic watermark information are uncorrelated (no electronic watermark is detected), and the information recording medium is the ROM (the physical index is present).

Cases (1) and (2) represent a content replay process of a recording medium other than the ROM, namely, a recording medium having no physical index. If the copy control information (copy never status) is detected as the electronic watermark, the replay operation is quit. If the copy control information (copy never status) is not detected, the replay controller 760 determines that the content is not copy protected, thereby continuing the replay operation.

Cases (3) and (4) represent a content replay process of the ROM, namely, of a recording medium having the physical index. If the GUID is detected as the electronic watermark, the replay operation is continued. If no GUID is detected, the replay controller 760 determines that the content has no GUID, thereby quitting the replay operation.

In accordance with the structure of the present invention, the data stored in the information recording medium is decrypted by the information processing apparatus such as the PC. The resulting data is then fed back to the drive device to detect the electronic watermark. Regardless of the format of the data stored in the information recording medium, or regardless of the type of encryptions, the electronic watermark detection process is reliably performed, and the replay control based on the detection result is performed.

A process performed by the drive device and the information processing apparatus during the content replay will now be discussed with reference to FIGS. 16 and 17.

Figure 16:
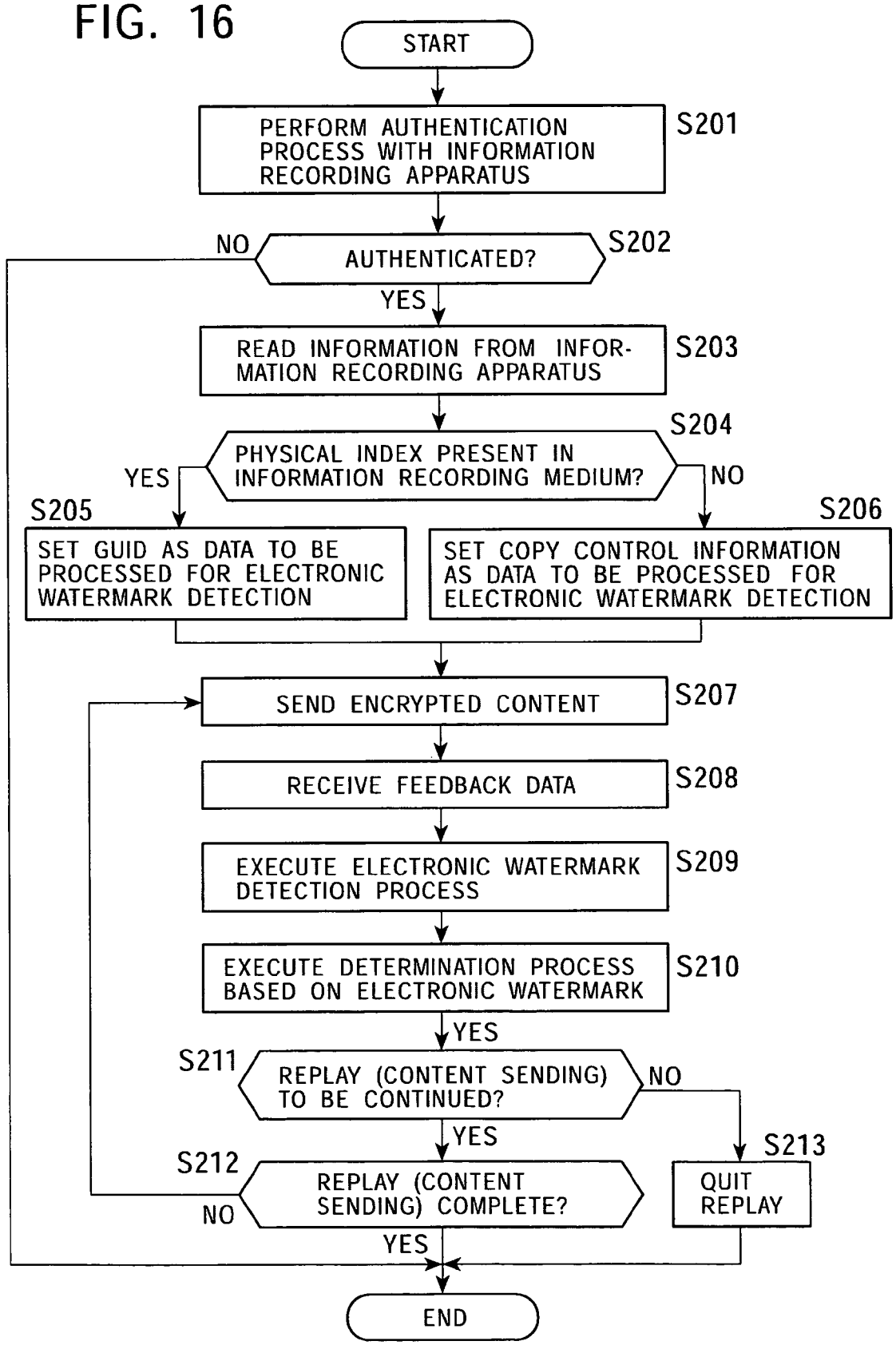
FIG. 16 is a flowchart illustrating a process performed by the drive device during a content replay period.

Referring to FIG. 16, the process of the drive device is discussed. In step S202, the drive device performs the mutual authentication process with the information processing apparatus and shares the session key with the information processing apparatus. If the mutual authentication process fails (No in step S202), the content replay ends with the content replay not completed.

If the mutual authentication has been successfully completed, the drive device performs information reading from the information recording medium in step S203. The key information and physical index of the lead-in area of and the encrypted content are read. The data reading may be performed in response to a request from the information processing apparatus.

In step S204, the drive device determines whether the physical index is read in the information reading process in step S203. If it is determined that the physical index is read, the drive device determines that the disk loaded in the drive device is an ROM disk. In step S205, the drive device sets the GUID read from the information recording medium as the electronic watermark detection process data. The GUID is set as encrypted data. In this sequence, the decryption process of the data read from the information recording medium is omitted.

If it is determined in step S204 that no physical index is read, the drive device determines that the disk loaded in the drive device is a disk other than an ROM disk. In step S206, the drive device sets the copy control information (copy never status) stored beforehand in the drive device as the electronic watermark detection process data.

In step S207, the encrypted content read from the information recording medium is sent to the information processing apparatus. In step S208, the drive device receives the feedback data for the electronic watermark detection from the information processing apparatus. In step S209, the drive device performs the detection process of the electronic watermark information. The information to be detected here is the GUID or the copy control information as already described.

In step S210, the determination processes are performed based on the electronic watermark detection result.

(1) Replaying is quit if the random number and the detected electronic watermark information are correlated (the electronic watermark is detected), and the information recording medium is other than the ROM (no physical index is present).

(2) Replaying is continued if the random number and the detected electronic watermark information are uncorrelated (no electronic watermark is detected), and the information recording medium is other than the ROM (no physical index is present).

(3) Replaying is continued if the random number and the detected electronic watermark information are correlated (the electronic watermark is detected), and the information recording medium is the ROM (the physical index is present).

(4) Replaying is quit if the random number and the detected electronic watermark information are uncorrelated (no electronic watermark is detected), and the information recording medium is the ROM (the physical index is present).

If the determination in step S211 is to quit the replay operation, the algorithm proceeds to step S213 to quit the replay operation. If the determination in step S211 is to continue the replay operation, the algorithm proceeds to step S212. If it is determined in step S212 that the replay content is not completed, the content sending in step S207, the reception of the feedback data in step S208 and the electronic watermark detection process are successively performed.

In the above algorithm, the reception of the feedback data and the electronic watermark detection are repeated. If the disk authenticity is verified in the reception of the feedback data and the electronic watermark detection process, and the content replay is permitted, no further data feedback process may be performed with a subsequent verification process not performed. In such a case, the information processing apparatus is notified of the electronic watermark verification result, and the end of the transmission of the feedback data.

Figure 17:
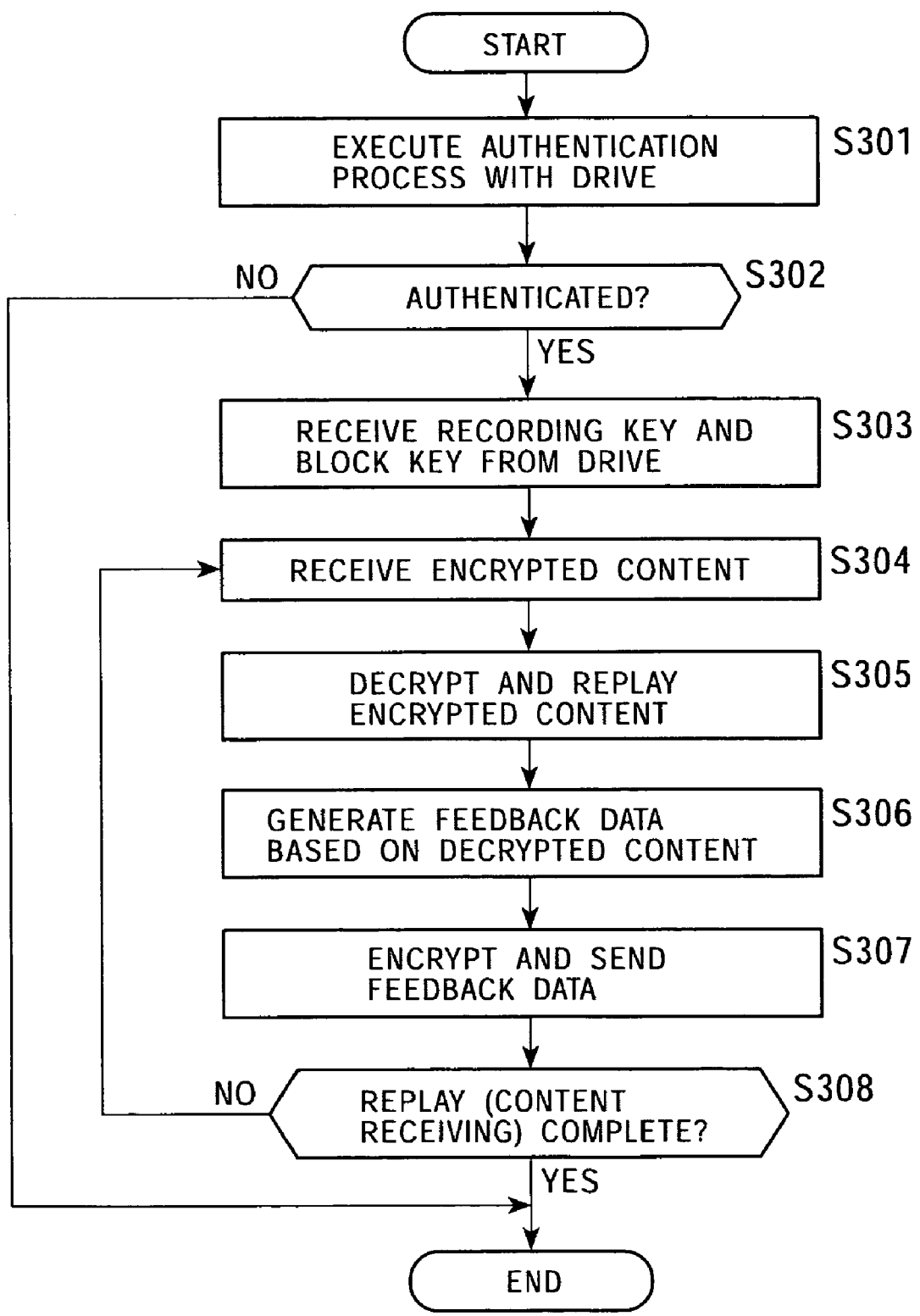
FIG. 17 is a flowchart illustrating a process performed by the information processing apparatus functioning as a host during the content replay period.

Referring to FIG. 17, the process of the information processing apparatus will now be discussed. In step S301, the information processing apparatus performs the mutual authentication process with the drive device and shares the session key with the drive device. If the mutual authentication process is unsuccessful (No in step S302), the algorithm ends with the content replay unexecuted.

If the mutual authentication is successfully completed, the information processing apparatus receives the recording key Krec and the encryption key of the block key Kblk from the drive device in step S303, and acquires the recording key Krec and the block key Kblk through the decryption process based on the session key and the recording key.

In step S304, the information processing apparatus receives the encrypted content from the drive device. In step S305, the information processing apparatus decrypts the encrypted content with the block key Kblk, thereby replaying the content.

In step S306, the information processing apparatus generates the feedback data for the electronic watermark verification based on the decrypted content. In step S307, the information processing apparatus encrypts the feedback data with the session key and sends the encrypted feedback data to the drive device.

In step S308, the information processing apparatus determines whether the replayed content is complete. If it is determined that the replay content is not complete, process in step S304 thereafter, namely, the reception of the content, and the generation and transmission of the feedback data are repeated until the end of the content replay.

As already discussed with reference to FIG. 16, if the disk authenticity is verified in the reception of the feedback data and the electronic watermark detection process, and the content replay is permitted, no further data feedback process is performed with a subsequent verification process not performed. In such a case, the drive device notifies the information processing apparatus of the electronic watermark detection result, and the information processing apparatus stops the transmission of the feedback data.

Data communication and data input and output process among the information recording medium, the drive device and the information processing apparatus in the content replay are now discussed with reference to FIG. 18.

in step S401, the drive device and the information processing apparatus authenticate each other, thereby sharing the common key. In step S402, the information processing apparatus outputs a request to send the block key to the drive device. In steps S403 and S404, the drive device reads the lead-in area information and the physical index from the information recording medium.

In step S405, the drive device sends, to the information processing apparatus, the recording key and the block key used in the encryption with the session key applied thereto. In step S406, the information processing apparatus outputs a request to send a content to the drive device.

In steps S407 and S408, the drive device reads the content from the information recording medium, and then sends the content to the information processing apparatus in step S409.

In step S410, the information processing apparatus encrypts the feedback data for electronic watermark verification generated based on the decrypted content, with the session key, and sends the encrypted feedback data to the drive device.

In step S411, the information processing apparatus successively outputs requests to send contents to the drive device. The drive device reads the contents from the information recording medium (steps S412 and S413), and sends the contents to the information processing apparatus (step S414).

In step S415 thereafter, the transmission of the feedback data for the electronic watermark verification and the transmission of the contents are repeated. It is also acceptable that the transmission of the feedback data is quit in response to the notification of the electronic watermark verification result sent from the drive device to the information processing apparatus in step S416.

The preferred embodiments of the present invention have been discussed. It will be apparent to those skilled in the art that various modifications and changes are possible without departing from the scope of the invention. It will be understood that the description of the preferred embodiments is exemplary rather than limiting, the invention being limited by the appended claims.

The above series of process steps may be performed using hardware, software, or a combination thereof. If the series of process steps is performed using software, a computer program of process sequence may be installed from a network or a recording medium to a memory of a computer assembled into dedicated hardware, or into a general-purpose computer that performs a variety of functions by installing various programs thereon.

The computer program may be recorded beforehand in a hard disk or a ROM as a recording medium. The computer program may be temporarily or permanently recorded on a removable recording medium such as a floppy disk, a CD-ROM, a magneto-optical disk, a DVD, a magnetic disk, or a semiconductor memory. The removable recording medium may be supplied in so-called package software.

The computer program may be installed from the aforementioned removable recording medium to the computer, may be transferred from a download site to the computer in a wireless fashion, or may be transferred to the computer through a network such as a Local Area Network (LAN) or the Internet in a wired fashion. The computer receives the computer program thus transferred, and installs the computer program onto the hard disk thereof.

The process steps discussed in this specification are sequentially performed in the time series order as stated. Depending on the throughput of the apparatus or as necessary, the steps may be performed in parallel or separately. The system in this specification refers to a logical set of apparatuses, and each apparatus is not necessarily housed in a single casing.

What is claimed is:

1. An information recording medium drive device for reading data from an information recording medium and outputting the read data to an information processing apparatus, the information recording medium drive device comprising:
    a replay unit for replaying the data comprising audio and/or video content from the information recording medium;
    a data input and output unit that outputs the replayed data to the information processing apparatus while receiving processed replayed data from the information processing apparatus, wherein the processed replayed data is data that has been read from the information recording medium by the information recording medium drive device, received by the information processing apparatus from the information recording medium drive device and processed in a predetermined process in the information processing apparatus, and wherein the predetermined process comprises at least one of decrypting, decoding and decompressing the replayed data;
    an electronic watermark detector located within the information recording medium drive device for performing an electronic watermark detection process on the processed replayed data; and
    a controller that controls data outputting of the replayed data to the information processing apparatus by the data input and output unit based on a result of the electronic watermark detection process on the processed replayed data of the electronic watermark detector;
    wherein the data outputting to the information processing apparatus and inputting of the processed replayed data supplied from the information processing apparatus are performed using a common signal path, and
    wherein the controller continues or quits the data outputting to the information processing apparatus based on the result of the electronic watermark detection process on the processed data.

2. An information recording medium drive device according to claim 1, wherein the information recording medium stores data that is encrypted and/or encoded, and
    wherein the electronic watermark detector performs the electronic watermark detection process on processed data that is generated based on a baseband signal that is input to the information processing apparatus from the information recording medium drive device and is then decrypted and/or decompressed by the information processing apparatus.

3. An information recording medium drive device according to claim 1, wherein the electronic watermark detector detects an identification embedded as an electronic watermark in data stored in the information recording medium, and wherein the controller continues or quits the data outputting to the information processing apparatus depending on a result of the detection of the identification.

4. An information recording medium drive device according to claim 1, wherein the electronic watermark detector detects copy control information embedded as an electronic watermark in data stored in the information recording medium, and wherein the controller continues or quits the data outputting to the information processing apparatus based on a result of the detection of the copy control information.

5. An information recording medium drive device according to claim 1, further comprising a recording medium type determination unit that determines whether or not the information recording medium is a read-only memory type permitting no data writing, wherein the controller continues or quits the data outputting to the information processing apparatus based on a result of the detection of an electronic watermark provided by the electronic watermark detector and a result of the determination of the recording medium type provided by the recording medium type determination unit.

6. An information recording medium drive device according to claim 1, further comprising an authenticator for performing an authentication process with the information processing apparatus, wherein authentication is established on condition that data stored in the information recording medium is output to the information processing apparatus.

7. An information recording medium drive device according to claim 6, wherein a data decryption key is encrypted based on a session key produced in the authentication process and the encrypted data decryption key is output to the information processing apparatus.

8. A data replay control method for an information recording medium drive device for reading data from an information recording medium and outputting the read data to an information processing apparatus, the data replay control method comprising:

replaying the data comprising audio and/or video content from the information recording medium;

outputting the replayed data to the information processing apparatus while inputting processed replayed data from the information processing apparatus, wherein the processed replayed data is data that has been read from the information recording medium by the information recording medium drive device, received by the information processing apparatus from the information recording medium drive device and processed in a predetermined process in the information processing apparatus, and wherein the predetermined process comprises at least one of decrypting, decoding and decompressing the replayed data;

performing, within the information recording medium drive device, an electronic watermark detection process on the processed data; and controlling data outputting by continuing or quitting the data outputting of the replayed data to the information processing apparatus based on a result of the electronic watermark detection process in the electronic watermark detecting step, wherein the data outputting to the information processing apparatus and inputting of the processed replayed data supplied from the information processing apparatus are performed using a common signal path.

9. A data replay control method according to claim 8, wherein the information recording medium stores data that is encrypted and/or encoded, and wherein the electronic watermark detecting step comprises performing the electronic watermark detection process on the processed data that is generated based on a baseband signal that is input to the information processing apparatus from the information recording medium drive device and is then decrypted and/or decompressed by the information processing apparatus.

10. A data replay control method according to claim 8, wherein the electronic watermark detecting step comprises detecting an identification embedded as an electronic watermark in the data stored in the information recording medium, and wherein the controlling step comprises continuing or quitting the data outputting to the information processing apparatus depending on a result of the detection of the identification.

11. A data replay control method according to claim 8, wherein the electronic watermark detecting step comprises detecting copy control information embedded as an electronic watermark in the data stored in the information recording medium, and wherein the controlling step comprises continuing or quitting the data outputting to the information processing apparatus based on a result of the detection of the copy control information.

12. A data replay control method according to claim 8, further comprising a recording medium type determining step for determining whether or not the information recording medium is a read-only memory type permitting no data writing, wherein the controlling step comprises continuing or quitting the data outputting to the information processing apparatus based on a result of the detection of an electronic watermark provided in the electronic watermark detecting step and a result of the determination of the recording medium type provided in the recording medium type determining step.

13. A data replay control method according to claim 8, further comprising an authenticating step for performing an authentication process with the information processing apparatus, wherein authentication is established in the authenticating step on condition that the data stored in the information recording medium is output to the information processing apparatus.

14. A data replay control method according to claim 13, further comprising outputting, to the information processing apparatus, a data decryption key that is encrypted based on a session key produced in the authenticating step.

15. A computer-readable medium encoded with computer-executable instructions that, when executed, perform a data replay control method for an information recording medium drive device for reading data from an information recording medium and outputting the read data to an information processing apparatus, the data replay control method comprising:

replaying the data comprising audio and/or video content from the information recording medium;

outputting the replayed data to the information processing apparatus while inputting processed replayed data from the information processing apparatus, wherein the processed replayed data is data that has been read from the information recording medium by the information recording medium drive device, received by the information processing apparatus from the information recording medium drive device and processed in a predetermined process in the information processing apparatus, and wherein the predetermined process comprises at least one of decrypting, decoding and decompressing the replayed data;

performing, within the information recording medium drive device, an electronic watermark detection process on the replayed processed data; and controlling data outputting by continuing or quitting the data outputting to the information processing apparatus based on a result of the electronic watermark detection process, wherein the data outputting to the information processing apparatus and inputting of the processed replayed data supplied from the information processing apparatus are performed using a common signal path.

16. An information recording medium drive device for reading data from an information recording medium and outputting the read data to an information processing apparatus, the information recording medium drive device comprising:

a replay means for replaying the data comprising audio and/or video content from the information recording medium;

a data input and output means for outputting the replayed data to the information processing apparatus while receiving processed replayed data from the information processing apparatus, wherein the processed replayed data is data that has been read from the information recording medium by the information recording medium drive device, received by the information processing apparatus from the information recording medium drive device and processed in a predetermined process in the information processing apparatus, and wherein the predetermined process comprises at least one of decrypting, decoding and decompressing the replayed data;

an electronic watermark detecting means located within the information recording medium drive device for performing an electronic watermark detection process on the processed replayed data; and a control means for controlling data outputting of the replayed data to the information processing apparatus by the data input and output unit based on a result of electronic watermark detection process of the electronic watermark detecting means, wherein the data outputting to the information processing apparatus and inputting of the processed replayed data supplied from the information processing apparatus are performed using a common signal path, and wherein the control means continues or quits the data outputting to the information processing apparatus based on the result of the electronic watermark detection process of the processed data of the electronic watermark detecting means.

17. A data replay control method for an information recording medium drive device for reading data from an information recording medium and outputting the read data to an information processing apparatus, the data replay control method comprising steps of:

replaying data comprising audio and/or video content from the information recording medium;

outputting the replayed data to the information processing apparatus while inputting processed replayed data from the information processing apparatus, wherein the processed replayed data is data that has been read from the information recording medium by the information recording medium drive device, received by the information processing apparatus from the information recording medium drive device and processed in a predetermined process in the information processing apparatus, and wherein the predetermined process comprises at least one of decrypting, decoding and decompressing the replayed data;

performing, within the information recording medium drive device, an electronic watermark detection process on the processed replayed data; and continuing or quitting outputting of the replayed data to the information processing apparatus based on a result of the electronic watermark detection process on the processed replayed data, wherein the data outputting to the information processing apparatus and inputting of the processed replayed data supplied from the information processing apparatus are performed using a common signal path.

18. A computer-readable medium encoded with computer-executable instructions that, when executed, perform a data replay control method for an information recording medium drive device for reading data from an information recording medium and outputting the read data to an information processing apparatus, the data replay control method comprising steps of:

replaying the data comprising audio and/or video content from the information recording medium;

outputting the replayed data to the information processing apparatus while inputting processed replayed data from the information processing apparatus, wherein the processed replayed data is data that has been read from the information recording medium by the information recording medium drive device, received by the information processing apparatus from the information recording medium drive device and processed in a predetermined process in the information processing a apparatus, and wherein the predetermined process comprises at least one of decrypting, decoding and decompressing the replayed data;

performing, within the information recording medium drive device, an electronic watermark detection process on the processed replayed data; and continuing or quitting outputting of the replayed data to the information processing apparatus based on a result of the electronic watermark detection process on the processed replayed data, wherein the data outputting to the information processing apparatus and inputting of the processed replayed data supplied from the information processing apparatus are performed using a common signal path.

* * * * *